United States Patent
Yamaguchi et al.

(10) Patent No.: US 7,027,029 B2
(45) Date of Patent: Apr. 11, 2006

(54) IMAGE DISPLAY APPARATUS

(75) Inventors: Yoshiro Yamaguchi, Ashigarakami-gun (JP); Yasufumi Suwabe, Ashigarakami-gun (JP); Yoshinori Machida, Ashigarakami-gun (JP); Motohiko Sakamaki, Ashigarakami-gun (JP); Takeshi Matsunaga, Ashigarakami-gun (JP); Kiyoshi Shigehiro, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 418 days.

(21) Appl. No.: 10/636,609

(22) Filed: Aug. 8, 2003

(65) Prior Publication Data

US 2004/0113902 A1 Jun. 17, 2004

(30) Foreign Application Priority Data

Dec. 17, 2002 (JP) .............................. 2002-364832

(51) Int. Cl.
*G09G 3/34* (2006.01)
(52) U.S. Cl. ........................................ 345/107; 345/84
(58) Field of Classification Search ................ 204/450, 204/600; 345/84, 107; 359/296; 349/86, 349/87, 88, 89, 90–92; 427/213.3; 430/32, 430/38
See application file for complete search history.

(56) References Cited

U.S. PATENT DOCUMENTS

| | | | |
|---|---|---|---|
| 6,827,624 B1 * | 12/2004 | Kurokawa et al. | 445/50 |
| 2002/0041423 A1 * | 4/2002 | Ogawa | 359/272 |
| 2002/0180688 A1 * | 12/2002 | Drzaic et al. | 345/107 |
| 2005/0052402 A1 * | 3/2005 | Kitano et al. | 345/102 |

FOREIGN PATENT DOCUMENTS

JP  A 2002-169191  6/2002

* cited by examiner

*Primary Examiner*—Vijay Shankar
*Assistant Examiner*—Nitin Patel
(74) *Attorney, Agent, or Firm*—Oliff & Berridge, PLC

(57) ABSTRACT

An image display apparatus has an image display medium and a voltage applying section. The image display medium has a top-plane substrate and a back-plane substrate. The top-plane substrate has a transparent display-side electrode whose entire surface is uniform, formed on a transparent substrate. The back-plane substrate has an inner electrode and an outer electrode, formed on a substrate. Conductive colored particles, whose color is different from a color of the inner electrode, are enclosed between the top-plane substrate and the back-plane substrate. The voltage applying section has a DC power source, a first switch, a second switch, and a control unit. When the color of the inner electrode is displayed, the control unit controls the first switch such that the inner electrode is connected to the DC power source, and controls the second switch such that the outer electrode is grounded. Then, the colored particles move reciprocally and move to the outer electrode.

15 Claims, 22 Drawing Sheets

IMAGE DISPLAY APPARATUS

CROSS-REFERENCE TO RELATED APPLICATION

This application claims priority under 35 USC 119 from Japanese Patent Application No. 2002-364832, the disclosure of which is incorporated by reference herein.

BACKGROUND OF THE INVENTION

1. Field of the Invention

The present invention relates to an image display apparatus, and in particular, to an image display apparatus using an image display medium which can be repeatedly rewritten upon by driving colored particles using an electric field.

2. Description of the Related Art

Conventionally, there is an image display medium using colored particles, so-called electronic paper, which can be repeatedly rewritten upon, and which has memory-like characteristics. An image display apparatus, using such an image display medium having memory-like characteristics, is effective for power-saving because it suffices that electric power is supplied to the image display medium only at the time of switching displays.

A method in which a color filter is disposed on a top-plane substrate has been commonly used in order to display a color image on such an image display apparatus using colored particles. However, there has been a problem that whiteness and resolution of a black-and-white image deteriorate in this method. Therefore, the present inventors proposed a method in which color display is carried out without quality deterioration of a black-and-white image, by coloring a surface of a back-plane substrate, and then carrying out color display using the back-plane substrate in addition to color display using the particles. This method is described in Japanese Patent Application Laid-Open (JP-A) No. 2002-169191, and the like.

In a conventional method, a color of the particles is displayed by making the particles adhere to the top-plane substrate. In addition to using such a conventional method, in the above-described method, the particles are moved and concentrated in a direction horizontal to a surface of the substrate, and particles in a desired region are withdrawn. Thus, a color of the surface of the back-plane substrate is displayed via the transparent top-plane substrate. For example, it is possible to display in three colors, by using colors of two types of insulating particles and the color of the back-plane substrate.

Such an image display apparatus 200 is shown in FIG. 21. As shown in FIG. 21, the image display apparatus 200 includes an image display medium 202 and a voltage applying section 204. Only one cell (pixel) is shown in FIG. 21.

In the image display medium 202, a spacer 210 is provided between a transparent top-plane substrate 206 forming an image display surface and a back-plane substrate 208. In the cell formed by the spacer 210, insulative black particles 212 which are positively charged and insulative white particles 214 which are negatively charged are enclosed.

The top-plane substrate 206 has a transparent display-side electrode 218 and a transparent insulating layer 220, which are formed on a transparent substrate 216.

The back-plane substrate 208 has an electrode layer 228 including a colored inner electrode 224 and an outer electrode 226, a colored layer 230, and a transparent insulating layer 232, which are formed on a substrate 222. The display-side electrode 218: is grounded, and the inner electrode 224 and the outer electrode 226 are connected to the voltage applying section 204.

In order to carry out white display in such an image display apparatus 200, the voltage applying section 204 applies a negative DC voltage (for example, −200V) to each of the inner electrode 224 and outer electrode 226. Due to an effect of an electric field generated between the substrates, the negatively electrified white particles 214 at the back-plane substrate 208 move to the top-plane substrate 206, and the positively electrified black particles 212 at the top-plane substrate 206 move to the back-plane substrate 208, as shown in FIG. 21. On the other hand, in order to carry out black display, the voltage applying section 204 applies a positive DC voltage (for example, +200V) to each of the inner electrode 224 and outer electrode 226.

Further, in order to make the black particles 212 and the white particles 214 withdraw to a periphery of the cell and display a color of the colored layer 230, the voltage applying section 204 applies a predetermined alternating voltage (for example, ±200V, frequency 100 Hz) to the inner electrode 224, and grounds the outer electrode 226. As a result, the black particles 212 and the white particles 214 move in a direction parallel to the substrate surface, and are concentrated on the grounded outer electrode 226, i.e., in the space between the substrates where no electric field is generated. Accordingly, particles are hardly present on the inner electrode 224, and the color of the colored layer 230 is visible from the top-plane substrate 206.

Further, when the predetermined alternating voltage is applied to the inner electrode 224 and the outer electrode 226, which are in the above-described state, the particles concentrated on the outer electrode 226 are dispersed, and the distribution of the particles can be returned to a uniform state.

However, in the above-described art, the plurality of insulative black particles 212 and the plurality of insulative white particles 214 are positively or negatively charged, respectively. Therefore, an alternating voltage must be used as a voltage applied for displaying the color of the colored layer 230 by making the particles withdraw to the periphery of the cell, and as a voltage applied for triboelectrically charging the particles by stirring the same.

In order to rapidly move a plurality of particles whose electrification polarities are different from each other to display the color of the colored layer 230, it is necessary to form a strong alternating electric field between the substrates. Further, in order to display the color of the particles, it is necessary to form a DC electric field between the substrates to move the particles to the top-plane substrate 206.

Therefore, as shown in FIG. 21, a DC power source 234 generating a DC voltage and an alternating power source 236 generating an alternating voltage are necessary for the voltage applying section 204. As shown in FIG. 22, in order to generate an alternating voltage, an inverter 238, a resistor 240, a capacitor 242, and the like are necessary for a power circuit, thus making the circuit structure complex and raising costs. Further, when the strengths of a DC electric field and an alternating electric field are different, a structure in which strength of an electric field is controlled is required. Because it is necessary to provide the power circuit with devices such as a load, a bleeder or the like, for an electric current to flow, original power-saving feature is diminished.

Moreover, an amount of charge that is applied to the particles is determined by an amount of friction or materials contained in the particles, and there are many cases in which the charged amount is not uniform, which can be an unstable factor from the standpoint of image quality. Therefore, in the prior art, control or the like for triboelectrically charging the particles by stirring the same are necessary, whereby extra electric power is consumed due to the control which does not relate to an image display.

The invention has been made in consideration of the above-described problems. An object of the invention is to provide an image display apparatus in which a color of a back-plane substrate can be displayed by moving particles to the periphery, as well as in which power-saving is achieved and control can be simplified.

SUMMARY OF THE INVENTION

In order to solve the above-described problems, a first aspect of the present invention is to provide an image display apparatus comprising: an image display medium which has at least a light-transmissive top-plane substrate, a back-plane substrate facing the aforementioned top-plane substrate, a pair of electrodes respectively provided on a surface of the aforementioned top-plane substrate facing the aforementioned back-plane substrate and on a surface of the aforementioned back-plane substrate facing the aforementioned top-plane substrate, a conductive particle group which is enclosed so as to move between the aforementioned electrodes due to an electric field formed by a voltage which is applied to the aforementioned pair of electrodes and whose color is different from a color of the aforementioned back-plane substrate, and a withdrawal electrode provided at a withdrawal region of the aforementioned particle group; and a voltage applying section which applies a DC voltage for moving the aforementioned particle group to the aforementioned withdrawal region to at least one of the aforementioned pair of electrodes when the color of the aforementioned back-plane substrate is to be displayed, and which applies a DC voltage for moving the aforementioned particle group to the outside of the aforementioned withdrawal region, to the aforementioned withdrawal electrode when the color of the aforementioned particle group is to be displayed.

In accordance with the invention, the image display medium is structured such that conductive particle group is enclosed between the top-plane substrate and the back-plane substrate which face one another. A pair of electrodes are provided on the surface of the top-plane substrate facing the back-plane substrate and on the surface of the back-plane substrate facing the top-plane substrate. Namely, the electrodes are respectively provided on the facing surfaces of the top-plane substrate and the back-plane substrate.

The top-plane substrate is at least light-transmissive, and can be structured from, for example, a glass substrate or an insulating resin which is one of transparent, semitransparent, and color-transparent.

The particle group is enclosed so as to move between the electrodes by an electric field formed by a voltage applied to the pair of electrodes, and the color thereof is different from the color of the back-plane substrate.

Here, the color of the back-plane substrate is at least one of a color of the back-plane substrate itself, a color of the electrode provided on the back-plane substrate of the pair of electrodes, a color of a colored portion if the colored portion is provided on the back-plane substrate, and the like.

Further, the image display medium has a withdrawal electrode for making the particle group be withdrawn to a withdrawal region. Furthermore, the image display medium is divided into a plurality of cells having predetermined shapes by, for example, providing a predetermined shaped spacer between the substrates. For example, one pixel can be structured by this one cell. At this time, the withdrawal region for making the particle group withdrawn is set to, for example, a region at the rim of the cell, and is set to a region smaller than a region other than the withdrawal region. Furthermore, the withdrawal electrode is provided on the withdrawal region.

Therefore, the color of the back-plane substrate can be displayed by making the particle group be withdrawn to the withdrawal region. Furthermore, the color of the particle group can be displayed by making the particle group uniformly distributed between the substrates. In this way, the color of the back-plane substrate in addition to the color of the particle group can be displayed.

When the color of the back-plane substrate is to be displayed, the voltage applying section applies a DC voltage to at least one of the pair of electrodes. For example, a first electrode which is one electrode of the pair of electrodes is grounded, and a DC voltage is applied to a second electrode which is the other electrode of the pair of electrodes. A voltage value of the DC voltage which is applied is set to a voltage value by which the particle group starts to move by an effect of an electric field formed between the pair of electrodes. Because the particles are conductive, for example, when a positive DC voltage is applied to the second electrode, the particles at the second electrode are positively charged, and move to the first electrode. The particles transfer the electric charge to the first electrode to be negatively charged, and move to the second electrode again. On the other hand, the particles at the first electrode are negatively charged, and move to the second electrode. The particles transfer the electric charge to the second electrode to be positively charged, and move to the first electrode again.

By repeating this routine, the particles move reciprocally between the substrates, and move in the direction parallel to the plane including the top-plane substrate by collision of the particles. Finally, the particles are concentrated in the withdrawal region. As a result, the back-plane substrate is exposed, and the color of the back-plane substrate can be visually recognized from the top-plane substrate.

On the other hand, when the color of the particle group is to be displayed, the voltage applying section applies a DC voltage for moving the particle group to the outside of the withdrawal region. For example, when a withdrawal electrode is provided on the back-plane substrate, a predetermined DC voltage is applied such that a DC electric field is formed between the withdrawal electrode and the first electrode of the pair of electrodes provided on the top-plane substrate. In this case, the predetermined DC voltage is set to a voltage by which the particle group starts to move by an effect of an electric field formed between the withdrawal electrode and the first electrode.

As a result, the particles move reciprocally between the substrates, and move in the direction parallel to the plane including the top-plane substrate by collision of the particles. Finally, the particles are dispersed from the withdrawal region to the outside of the withdrawal region. As a result, the back-plane substrate is concealed by the particles, and the color of the particles can be visually recognized from the top-plane substrate.

In this way, by using conductive particles, the particles can be moved in the direction parallel to the substrate surface only by applying a DC voltage to the substrates. Accordingly, a power source generating an alternating voltage is not required, and power saving can be achieved and the apparatus can be structured so as to be inexpensive. Furthermore, because an electric charge is supplied from the electrode, there is no need to control an electric charge amount of the particles, and thus control can be simplified.

A second aspect of the invention is to provide an image display apparatus having the feature that a concealing portion for concealing the aforementioned particle group is further provided.

The concealing portion is provided at, for example, a position corresponding to the withdrawal region of the top-plane substrate so that the particles which are concentrated in the withdrawal region cannot be visually recognized from the top-plane substrate. As a result, because the particles which are concentrated in the withdrawal region are concealed, display noise can be prevented, and the quality of image can be improved.

A third aspect of the invention is to provide an image display apparatus having the feature that the aforementioned concealing portion is a housing portion which is provided at the aforementioned back-plane substrate and which is for housing the aforementioned particle group, and the aforementioned withdrawal electrodes are a pair of withdrawal electrodes provided at the aforementioned housing portion.

In accordance with the invention, when the color of the back-plane substrate is displayed, the particles are housed in the housing portion provided at the back-plane substrate. As a result, the particles are concealed, and the color of the back-plane substrate can be displayed. Furthermore, when the particles are to be returned from the housing portion to the space between the substrates, a predetermined DC voltage is applied to the pair of withdrawal electrodes. As a result, the particles move reciprocally in the direction parallel to the substrate surface, and move in the direction perpendicular to the above-described parallel direction by collision of the particles. Finally, the particles are dispersed from the withdrawal region to the outside of the withdrawal region. Accordingly, the back-plane substrate is concealed by the particles, and the color of the particles can be visually recognized from the top-plane substrate.

A fourth aspect of the invention is to provide an image display apparatus having the feature that the aforementioned pair of electrodes and the aforementioned withdrawal electrodes are a passive matrix structure.

In accordance with the invention, as the pair of electrodes and the withdrawal electrodes are made to be the passive matrix structure, the structure of the electrodes can be simplified, and the image display medium can be structured so as to be inexpensive.

A fifth aspect of the invention is to provide an image display apparatus having the feature that layers having conductive particle groups whose colors are different from the color of the aforementioned particle group is further provided between the aforementioned top-plane substrate and the aforementioned back-plane substrate.

In accordance with the invention, layers of plural types of particle groups are provided between the top-plane substrate and the back-plane substrate. In this case, it is structured such that each layer has the aforementioned pair of electrodes and the aforementioned withdrawal electrode, and portions adjacent to one another of the respective layers are made transparent. When the color of the back-plane substrate is to be displayed, the particle group of each layer is withdrawn to each withdrawn region. As a result, the color of the back-plane substrate can be displayed from the top-plane substrate.

Furthermore, when a color of the particle group in the layer at the side of the top-plane substrate, i.e., in the upper layer is to be displayed, a DC voltage is applied to the withdrawal electrode of the layer in order for the particle group in the upper layer to be dispersed in the layer, similarly to the above description. On the other hand, when a color of the particle group in the layer at the side of the back-plane substrate, i.e., in the lower layer is to be displayed, a DC voltage is applied to the pair of electrodes of the layer in order for the particle group in the upper layer to be withdrawn to each withdrawn region. Moreover, a DC voltage is applied to the withdrawal electrode in the lower layer in order for the particle group to be dispersed in the layer. As a result, the color of the particle group in the lower layer can be displayed from the top-plane substrate. Note that three or more of layers of the particle groups whose colors are different may be provided.

In this way, a variety of colors can be displayed by the colors of the plural types of the particles whose colors are different and the color of the back-plane substrate.

Furthermore, a sixth aspect of the invention is to provide an image display apparatus comprising: an image display medium which has a light-transmissive top-plane substrate, a back-plane substrate disposed so as to face the aforementioned top-plane substrate, a pair of electrodes formed from a first electrode provided on the surface of the aforementioned top-plane substrate facing the aforementioned back-plane substrate and a second electrode provided on the surface of the aforementioned back-plane substrate facing the aforementioned top-plane substrate, a conductive particle group which is enclosed between the aforementioned top-plane substrate and the aforementioned back-plane substrate so as to move between the aforementioned pair of electrodes due to an electric field formed by a voltage applied to the pair of electrodes and which has a color that is different from a color of the aforementioned back-plane substrate, and a withdrawal electrode disposed at a region on the aforementioned back-plane substrate other than a region where the aforementioned second electrode is provided; and a voltage applying section, wherein the voltage applying section makes the particle group move to a withdrawal region which is between the aforementioned first electrode and the aforementioned withdrawal electrode by applying a first DC voltage to at least one of the aforementioned pair of electrodes, whereby the color of the aforementioned back-plane substrate is displayed, and the aforementioned voltage applying section makes the aforementioned particle group move to the outside of the aforementioned withdrawal region by applying a second DC voltage to the aforementioned withdrawal electrode, whereby the color of the aforementioned particle group is displayed.

DETAILED DESCRIPTION OF THE INVENTION (First Embodiment)

A first embodiment of the present invention will be described in detail below with reference to the drawings.

Figure 1:
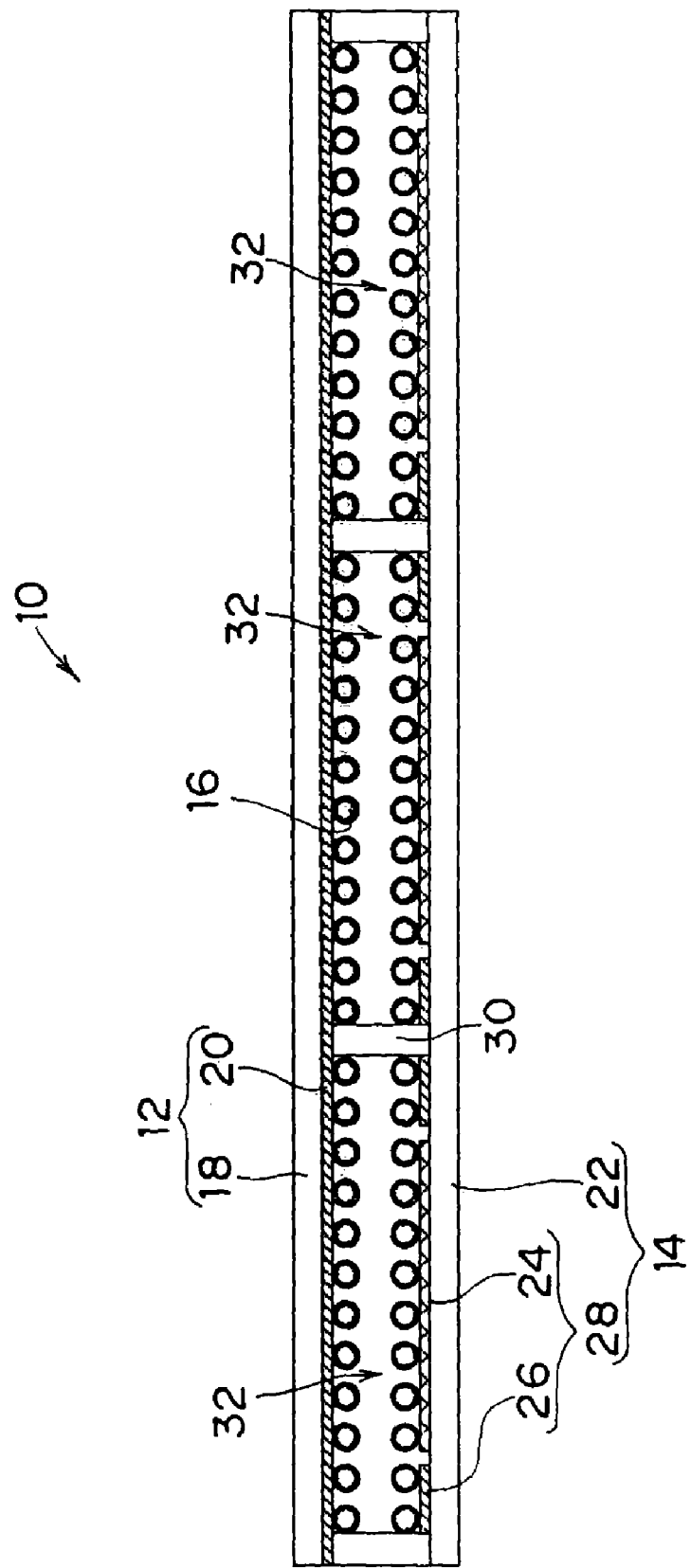
FIG. 1 is a cross-sectional view of an image display medium according to a first embodiment.

An image display medium 10 according to the present embodiment is shown in FIG. 1. The image display medium 10 has a transparent top-plane substrate 12 forming an image display surface and a back-plane substrate 14.

The top-plane substrate 12 has a transparent display-side electrode 20, whose entire surface is uniform, formed on a transparent substrate 18. The back-plane substrate 14 has a rear face-side electrode 28 comprising a rectangular inner electrode 24 and a rectangular ring-shaped outer electrode 26, as shown in FIG. 2, formed on a substrate 22.

Figure 2:
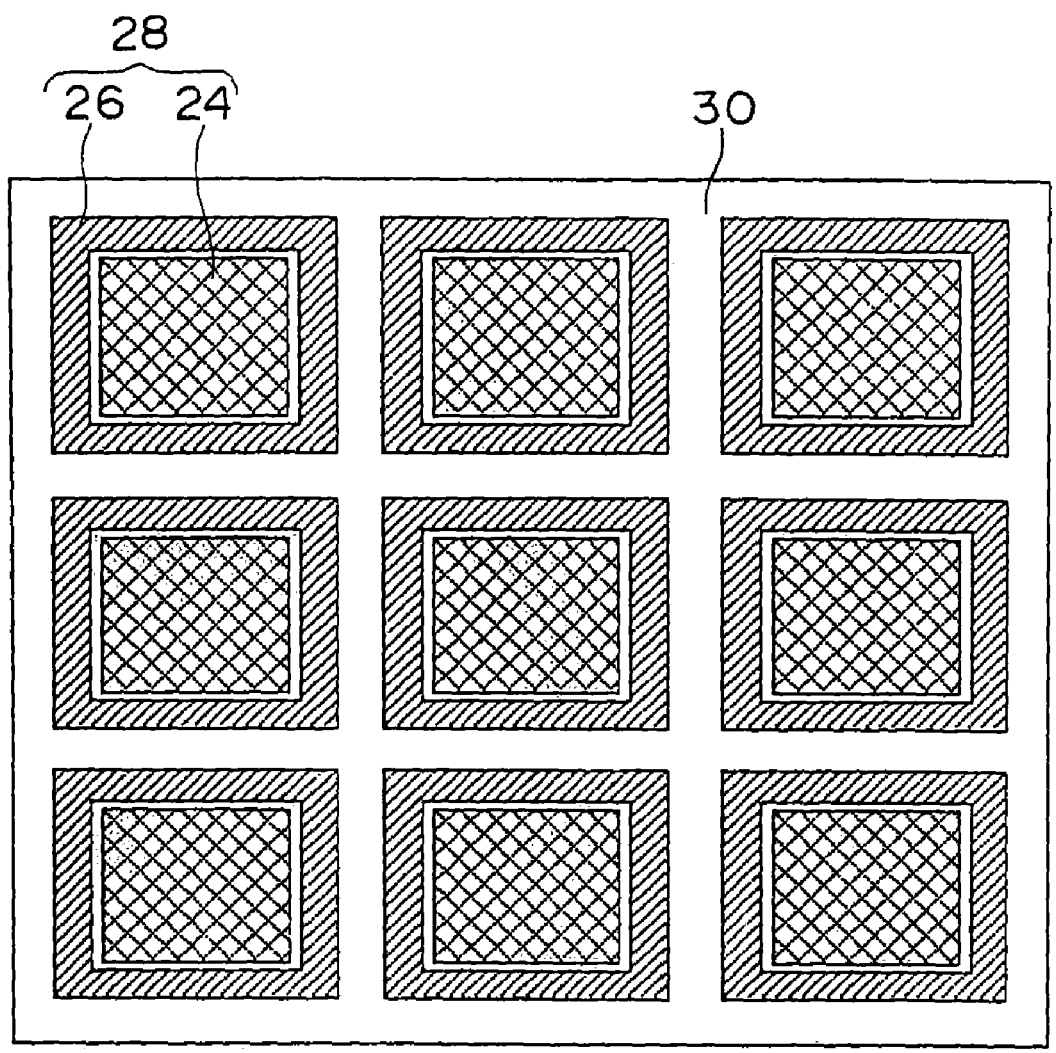
FIG. 2 is a plan view of a rear face-side electrode.

A grid-shaped spacer 30 as shown in FIG. 2 is provided between the top-plane substrate 12 and the back-plane substrate 14. A predetermined spacing between the substrates is regulated by the spacer 30, and cells 32 constituting pixels are formed between the substrates by the spacer 30.

Conductive colored particles (for example, black particles) 16 are enclosed in the respective cells 32. The inner electrode 24 is colored with a color that is different from the color of the colored particles 16.

A configuration in which the image display medium 10 has 9(3×3) cells is shown in FIGS. 1 and 2. However, the number of the cells is not limited thereto.

Figure 3:
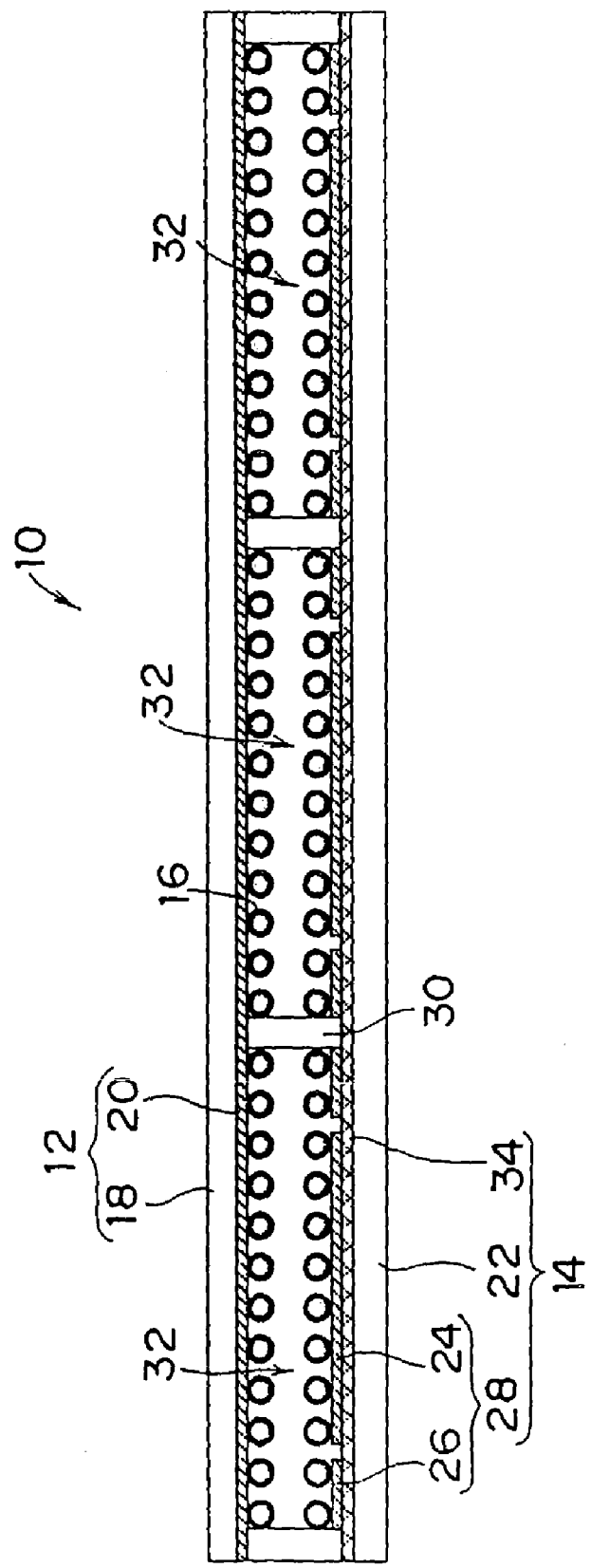
FIG. 3 is a cross-sectional view showing another example of the image display medium.
Figure 4:
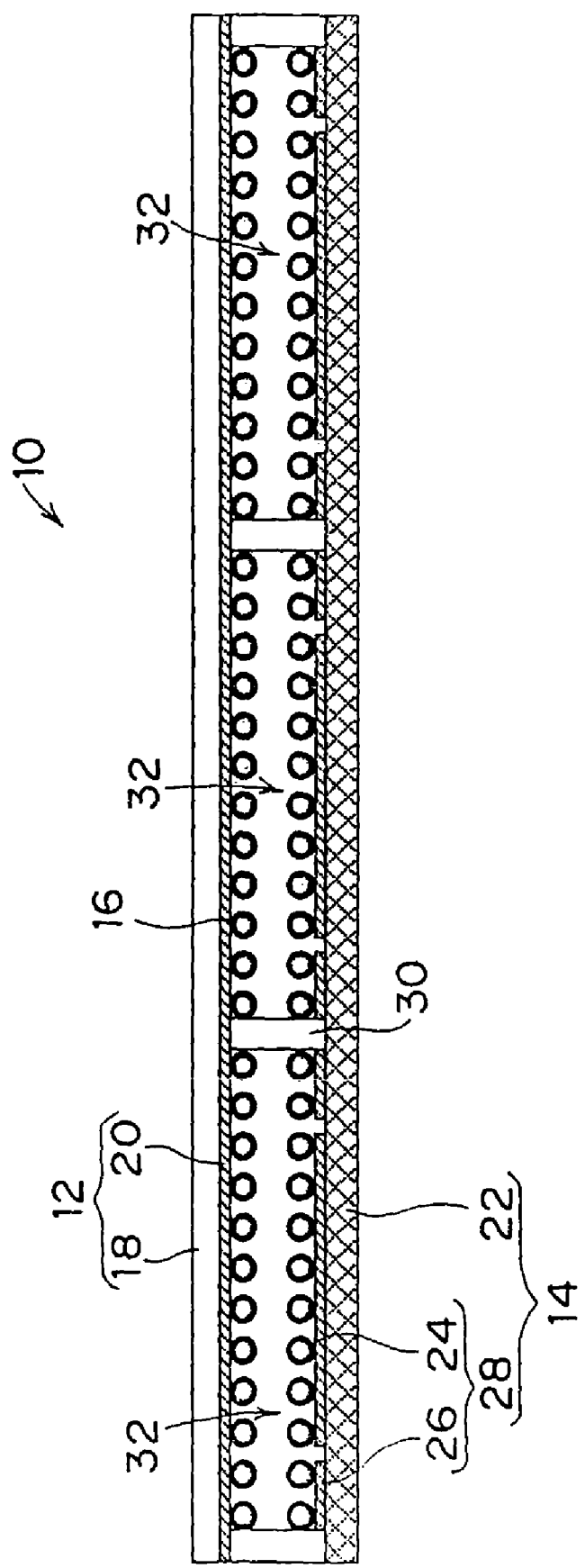
FIG. 4 is a cross-sectional view showing the other example of the image display medium.

Although a configuration in which the inner electrode 24 is colored is shown in FIGS. 1 and 2, as shown in FIG. 3, the inner electrode 24 and the outer electrode 26 may be transparent electrodes, and a colored layer 34 having a color that is different from the color of the colored particles 16 may be separately provided on the substrate 22. Further, as shown in FIG. 4, the substrate 22 itself may be colored, or the substrate 22 may include a material having a color that is different from the color of the colored particles 16.

Figure 5:
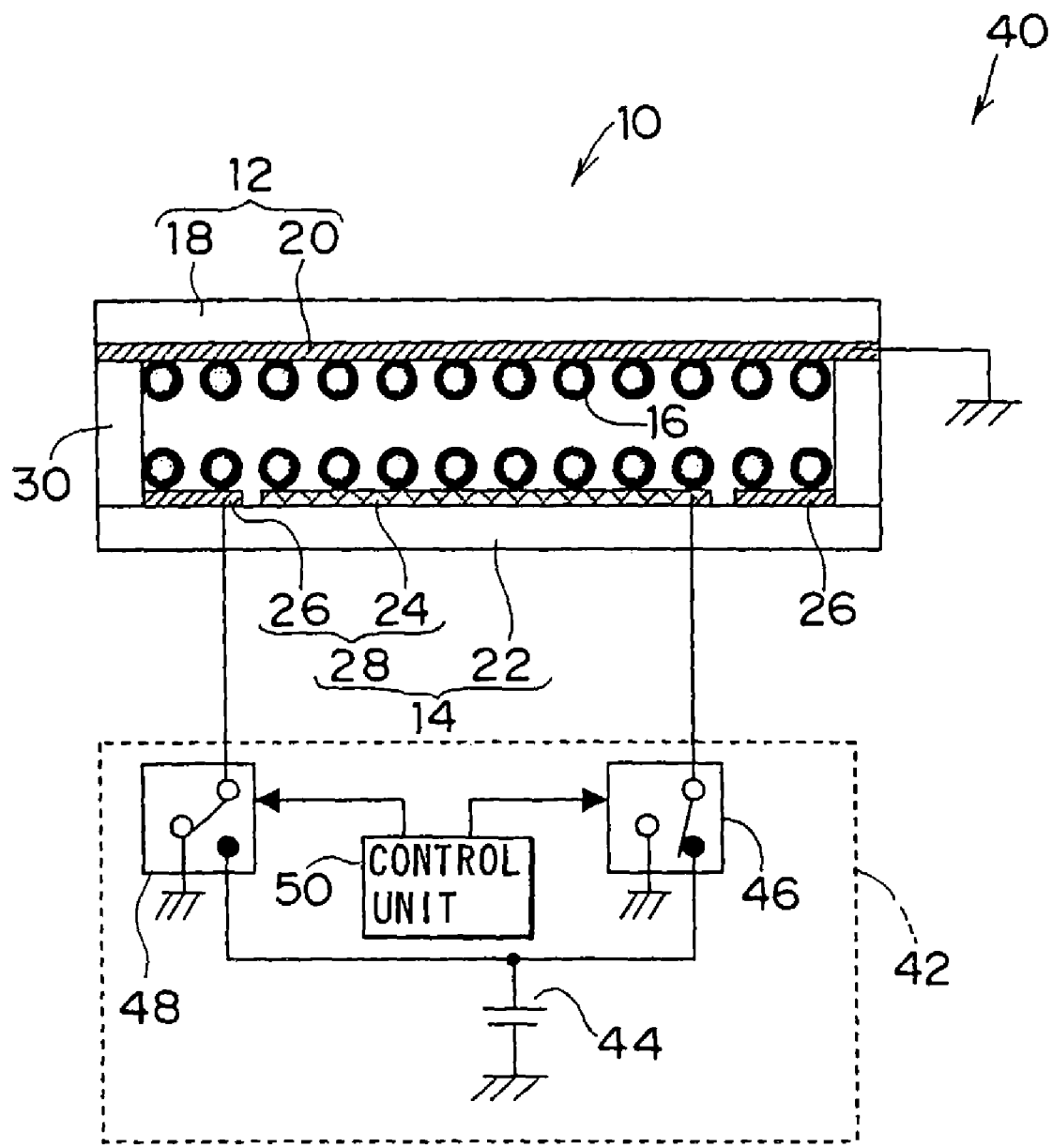
FIG. 5 is a schematic block diagram of an image display apparatus according to the first embodiment.

A schematic configuration of the image display apparatus 40 using the image display medium 10 as shown in FIG. 1 is shown in FIG. 5. The image display apparatus 40 includes the image display medium 10 and a voltage applying section 42. In order to simplify explanation, one cell is shown in FIG. 5.

The voltage applying section 42 is configured so as to include a DC power source 44, switches 46 and 48, and a control unit 50. The switches 46 and 48 are controlled by the control unit 50. The control unit 50 controls the switches 46 and 48 in accordance with image information.

The switch 46 is provided between the inner electrode 24 of the image display medium 10 and the DC power source 44, and switches between the inner electrode 24 being connected to the DC power source 44 and being grounded.

The switch 48 is provided between the outer electrode 26 of the image display medium 10 and the DC power source 44, and switches between the outer electrode 26 being connected to the DC power source 44 and being connected to the grounded side.

Accordingly, when the inner electrode 24 is connected to the DC power source 44 by the switch 46, a DC voltage generated by the DC power source 44 is applied to the inner electrode 24. When the outer electrode 26 is connected to the DC power source 44 by the switch 48, a DC voltage generated by the DC power source 44 is applied to the outer electrode 26.

A display-side electrode 20 is grounded in the above-description. However, the display-side electrode 20 may be ungrounded, and another DC power source other than the DC power source 44 may be connected to the display-side electrode 20 to supply a DC voltage. This is because it suffices that a DC field which can move particles is formed between the substrates. In this case, it suffices that a difference between a DC voltage applied to the display-side electrode 20 and a DC voltage applied to the rear face-side electrode 28 is equal to a potential difference at which particles start to move.

The inner electrode 24 and the outer electrode 26 may be provided on the top-plane substrate 12, and the electrode whose entire surface is uniform may be provided on the back-plane substrate 14.

The display-side electrode 20 and the inner electrode 24 correspond to a pair of electrodes of the present invention. The outer electrode 26 corresponds to a withdrawal electrode of the present invention. The colored particles 16 correspond to a particle group of the present invention. The voltage applying section 42 corresponds to a voltage applying section of the present invention.

Figure 6:
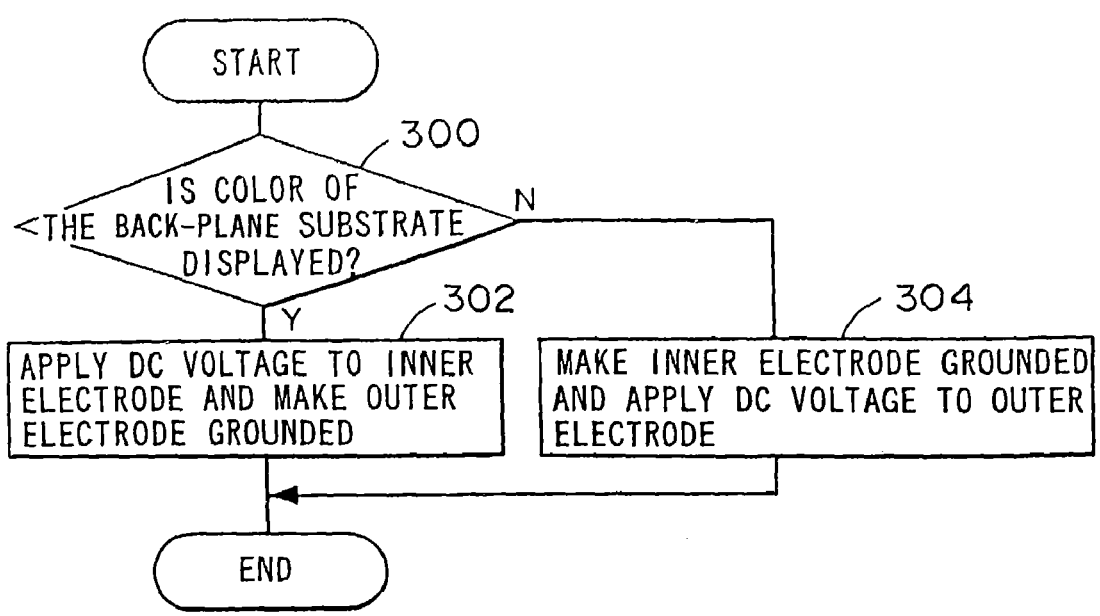
FIG. 6 is a flowchart of a control routine executed at a control unit.

Next, as operation of the present embodiment, a control routine executed at the control unit 50 will be described with reference to a flowchart shown in FIG. 6. The control routine shown in FIG. 6 is executed for each pixel.

First, at step 300, on the basis of image information, it is judged whether a target pixel is to display a color of the back-plane substrate, i.e., the color of the inner electrode 24, or to display the color of the particles.

Further, when it is judged that the color of the back-plane substrate is to be displayed, the routine proceeds to step 302. When it is judged that the color of the particles is to be displayed, the routine proceeds to step 304.

Figure 7:
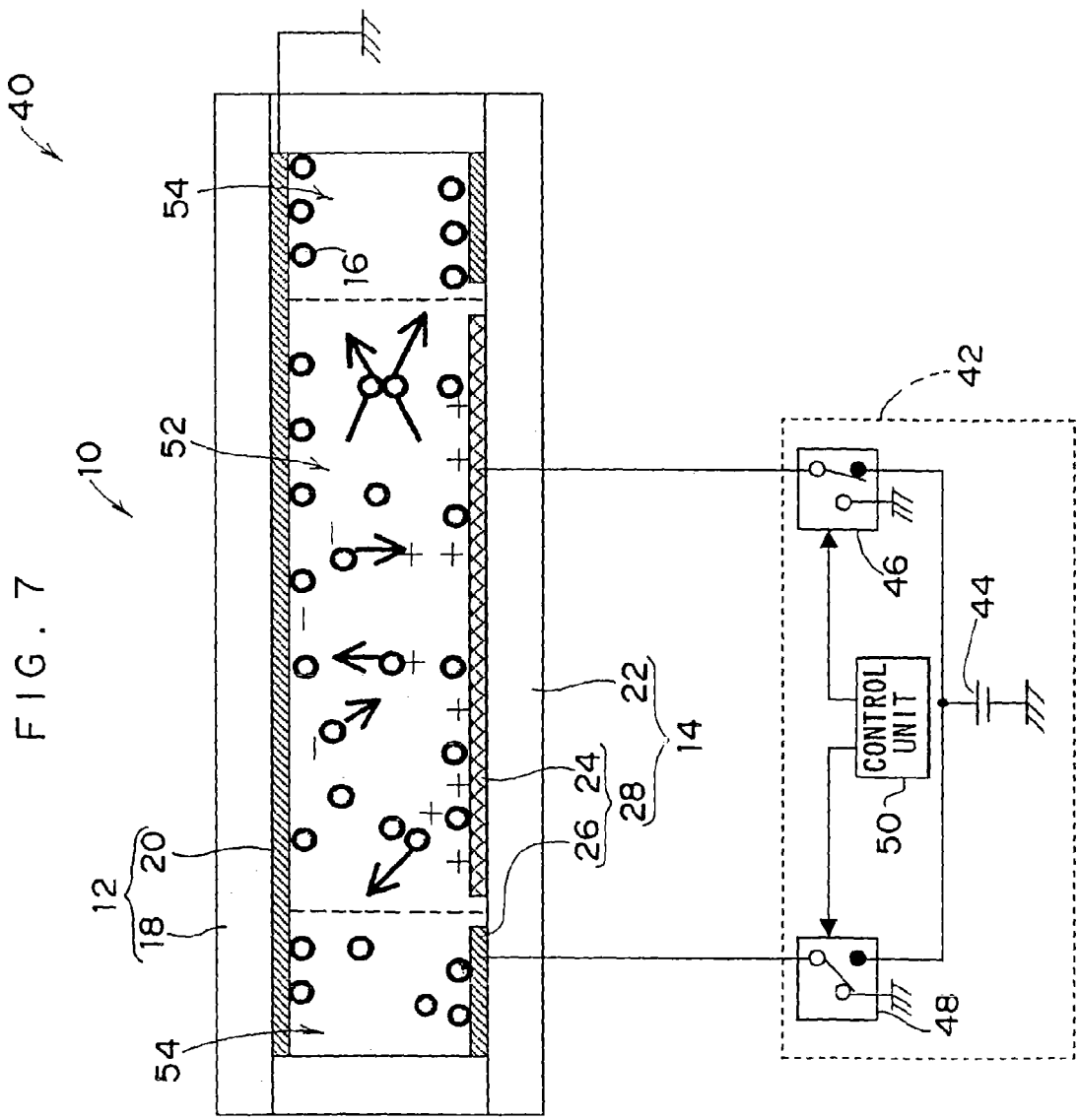
FIG. 7 is a schematic block diagram of the image display apparatus.

At step 302, as shown in FIG. 7, the control unit 50 controls the switch 46 such that the inner electrode 24 is connected to the DC power source 44, and controls the switch 48 such that the outer electrode 26 is grounded.

A positive DC voltage is then applied to the inner electrode 24. Because the display-side electrode 20 is grounded, a positive DC electric field is generated at a region 52 above the inner electrode 24, and no electric field is generated at a withdrawal region 54 above the outer electrode 26. A voltage value of the applied DC voltage is set to a voltage value at which the colored particles 16 start to move by an effect of the electric field formed between the inner electrode 24 and the display-side electrode 20.

Because the colored particles 16 are conductive, the colored particles 16 at the inner electrode 24 become positively charged, and move to the display-side electrode 20. The colored particles 16 transfer the electric charge to the display-side electrode 20 and become negatively charged, and move to the inner electrode 24 again. On the other hand, the colored particles 16 at the display-side electrode 20 become negatively charged, and move to the inner electrode 24. The colored particles 16 transfer the electric charge to the inner electrode 24 and become positively charged, and move to the display-side electrode 20 again.

Figure 8:
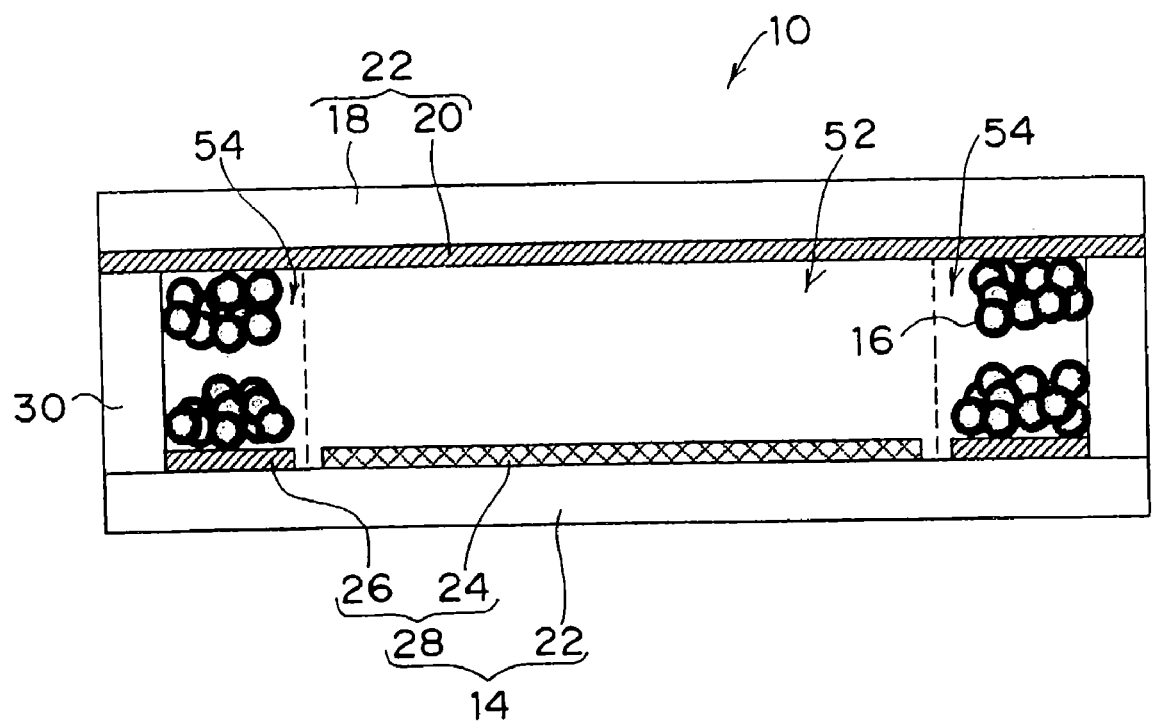
FIG. 8 is a cross-sectional view of the image display medium in a state in which a color of a back-plane substrate is displayed.

By repeating this routine, the colored particles 16 move reciprocally between the substrates in the region 52. At this time, as shown in FIG. 7, the colored particles 16 move in a direction parallel to a plane including the top-plane substrate by collision of the particles. Finally, as shown in FIG. 8, the colored particles 16 are concentrated in the withdrawal region 54 where no electric field is generated. As a result, the back-plane substrate 14 is exposed, and the color of the colored inner electrode 24 on the back-plane substrate can be visually recognized from the top-plane substrate.

On the other hand, at step 304, the control unit 50 controls the switch 46 such that the inner electrode 24 is grounded, and controls the switch 48 such that the outer electrode 26 is connected to the DC power source 44.

As a result, a positive DC voltage is applied to the outer electrode 26. Because the display-side electrode 20 is grounded, a positive DC electric field is generated at the withdrawal region 54, and no electric field is generated at the region 52.

Because the colored particles 16 are conductive, the colored particles 16 at the outer electrode 26 become positively charged, and move to the display-side electrode 20. The colored particles 16 transfer the electric charge to the display-side electrode 20 and become negatively charged, and move to the outer electrode 26 again. On the other hand, the colored particles 16 at the display-side electrode 20 become negatively charged, and move to the outer electrode 26. The colored particles 16 transfer the electric charge to the outer electrode 26 and become positively charged, and move to the display-side electrode 20 again.

Figure 9:
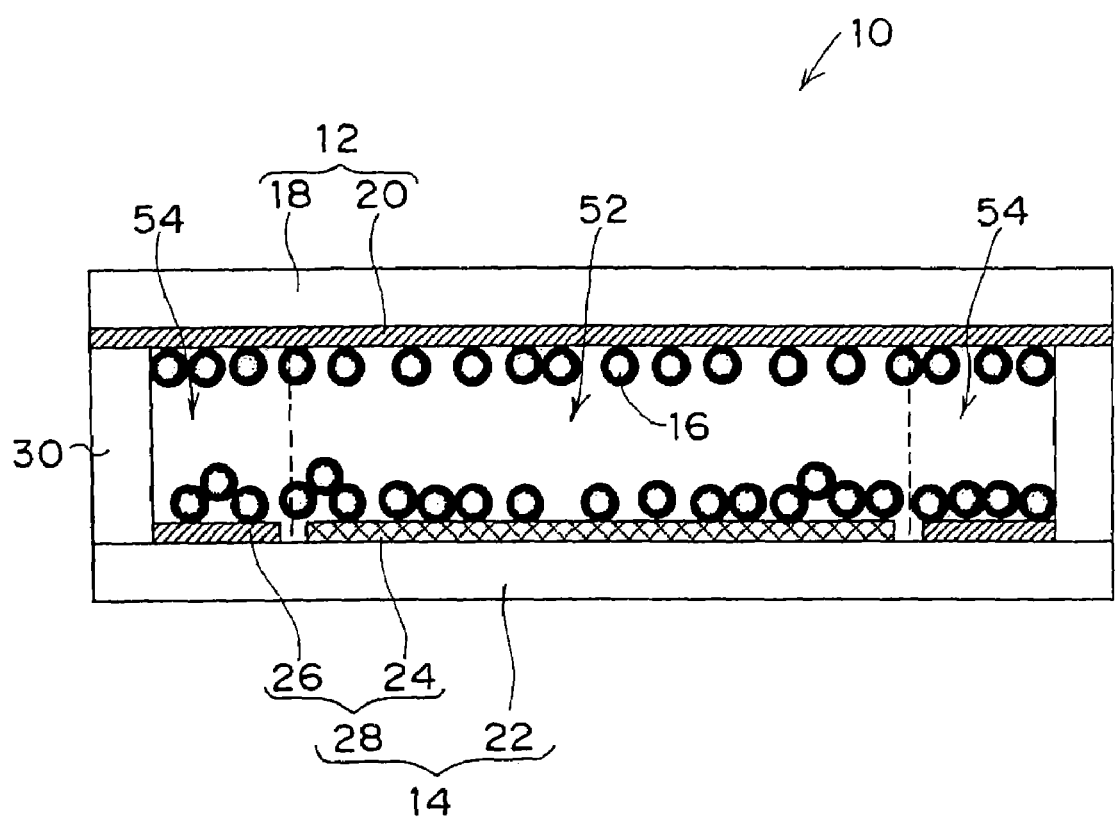
FIG. 9 is a cross-sectional view of the image display medium in a state in which a color of particles is displayed.

By repeating this routine, the colored particles 16 move reciprocally between the substrates in the withdrawal region 54. At this time, the colored particles 16 move in the direction parallel to the plane including the top-plane substrate by collision of the particles. Finally, as shown in FIG. 9, the colored particles 16 are dispersed to the region 52 where no electric field is generated. As a result, the back-plane substrate 14 is concealed by the colored particles 16, and the color of the particles can be visually recognized from the top-plane substrate 12.

Figure 10:
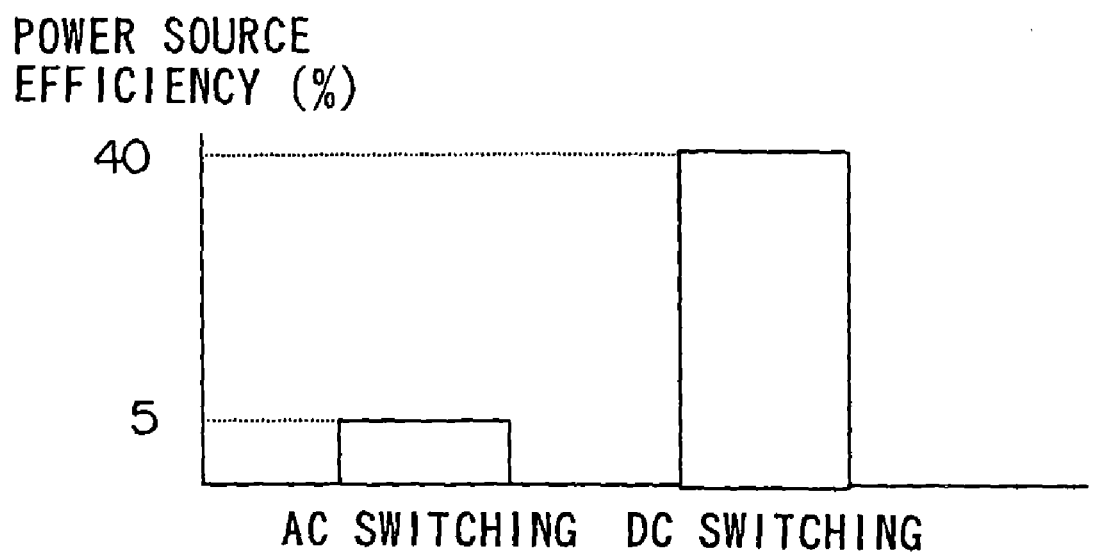
FIG. 10 is a view for explanation of the power source efficiencies of an AC switching and a DC switching.

In this way, by using the conductive colored particles, the particles can be moved in the direction parallel to the substrate surface by only applying a DC voltage to the substrates. Accordingly, there is no need to provide an AC power source generating an alternating voltage at the voltage applying section 42. Therefore, power saving can be achieved, and the apparatus can be configured so as to be inexpensive. For example, as shown in FIG. 10, power source efficiency in a case of conventional AC switching which uses a DC power source and an AC power source is about 5%. Whereas, power source efficiency in a case of DC switching which uses only a DC power source is about 40%. The power source efficiency is thus greatly improved.

Further, because an electric charge is supplied from the electrodes to the colored particles, there is no need to control an amount of the electric charge of the particles. Therefore, control for triboelectrically charging the particles or the like is not required, and control can be simplified.

Figure 11:
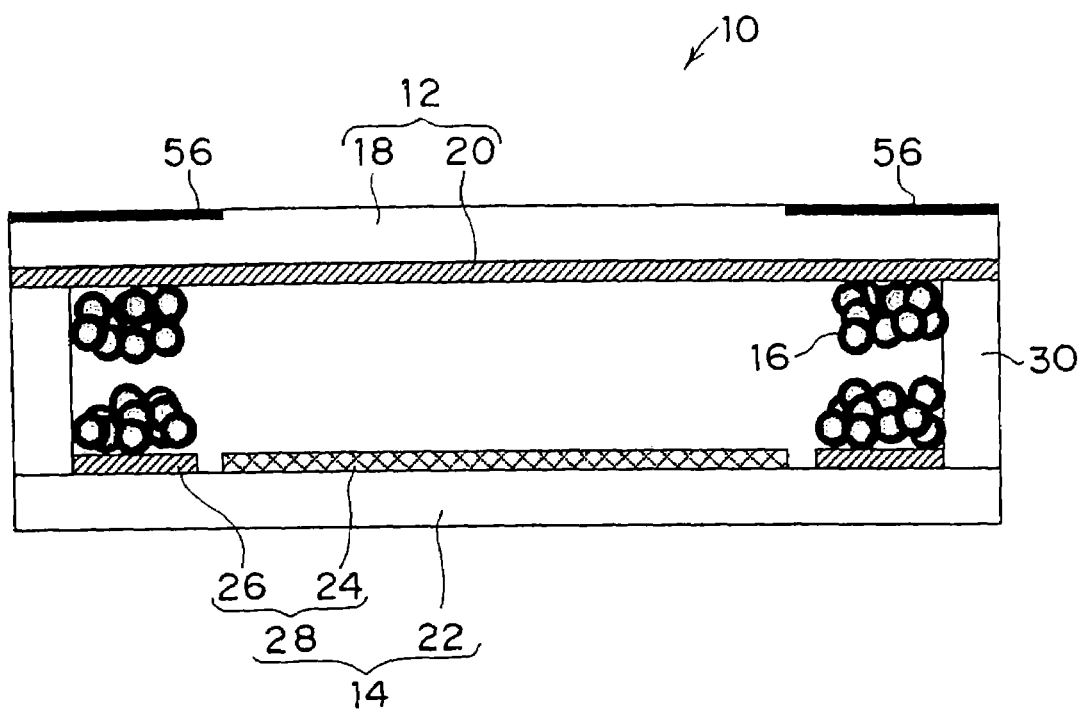
FIG. 11 is a cross-sectional view showing the other example of the image display medium.

As shown in FIG. 11, a black matrix 56 serving as a concealing portion may be provided at a position on the top-plane substrate 12 corresponding to the withdrawal region 54 so that the colored particles 16 concentrated in the withdrawal region 54 cannot be visually recognized from the top-plane substrate 12. As a result, the colored particles 16 concentrated in the withdrawal region 54 are concealed, so that display noise can be prevented, and image quality can be improved.

In the present embodiment, a case has been described in which a so-called active matrix system is used as a voltage applying system. Here, in the active matrix system, a voltage is independently applied to each pixel. However, the invention is not limited thereto, and a passive matrix system may be used.

Figure 12A:
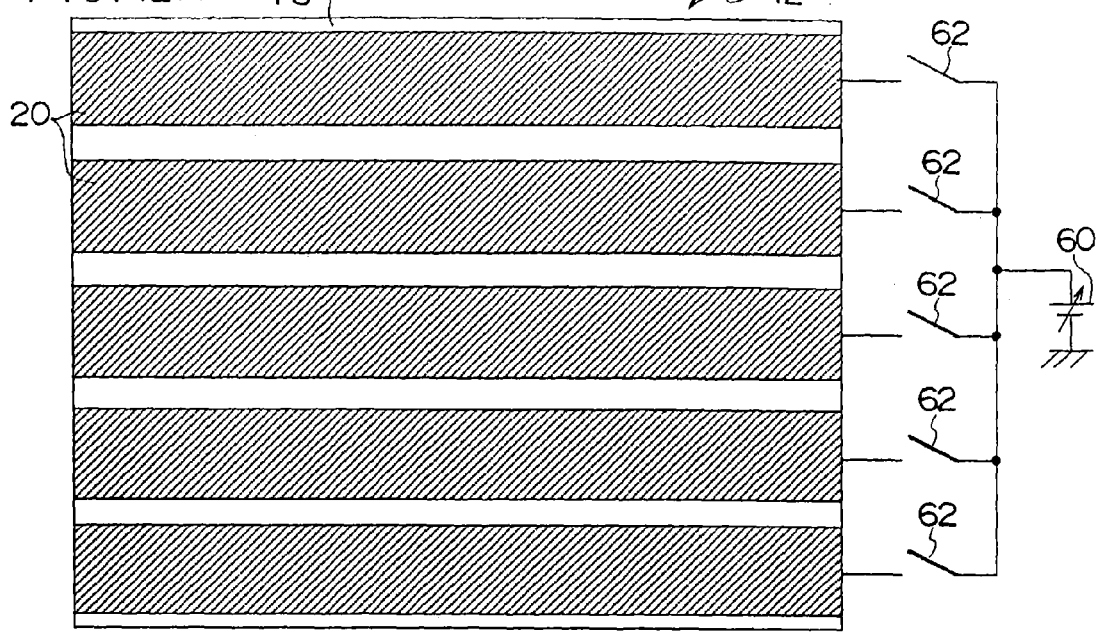
FIG. 12A is a plan view of a top-plane substrate.
Figure 12B:
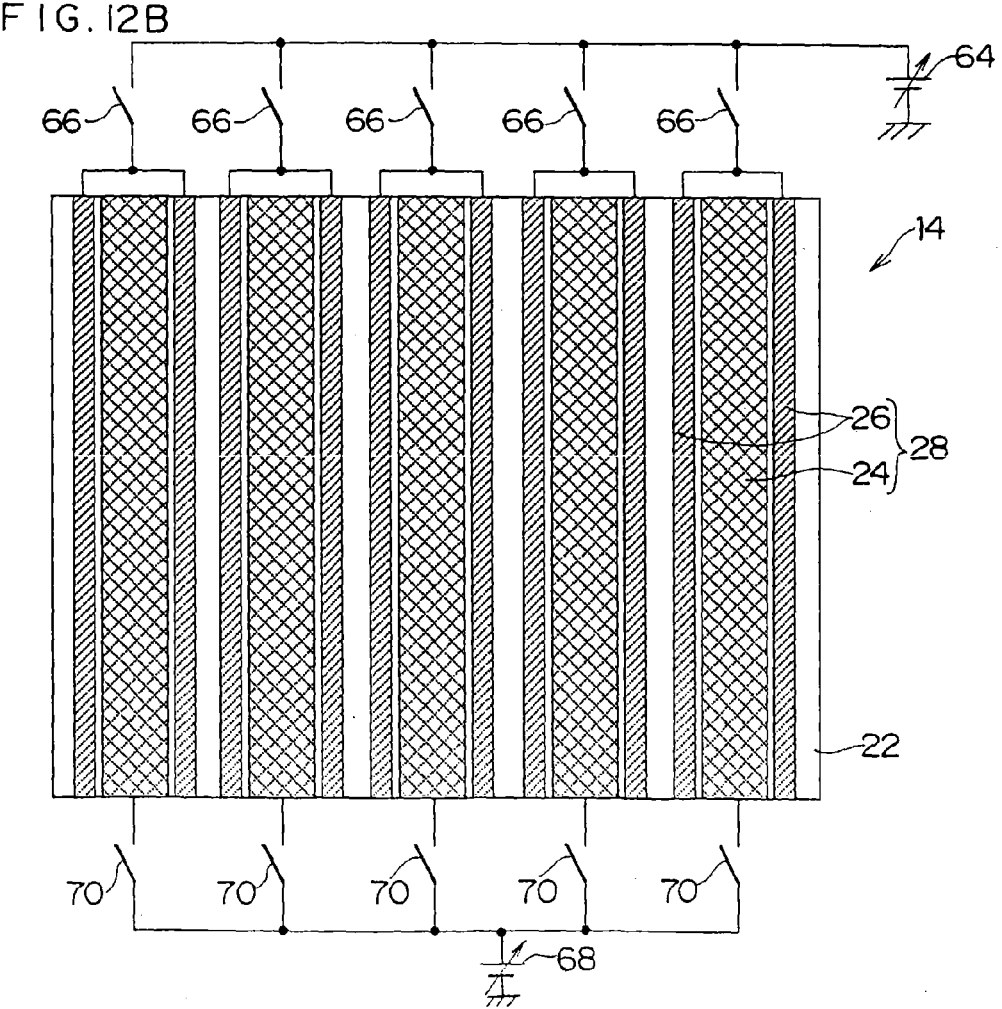
FIG. 12B is a plan view of a back-plane substrate.

In such a case, as shown in FIG. 12A, a plurality of line-shaped display-side electrodes 20 are formed on the substrate 18. Moreover, as shown in FIG. 12B, the rear face-side electrodes 28, which are composed of the line-shaped inner electrode 24 and the line-shaped outer electrodes 26 formed at the both sides of the inner electrode 24, are formed on the substrate 22 so as to be positioned in a direction perpendicular to the display-side electrodes 20 when the image display medium is seen in plan view.

As shown in FIG. 12A, switches 62 are respectively provided between the display-side electrodes 20 and a DC power source 60. As shown in FIG. 12B, switches 66 are respectively provided between the outer electrodes 26 and a DC power source 64, and switches 70 are respectively provided between the inner electrodes 24 and a DC power source 68. The switches 62, 66, and 70 are controlled by the control unit 50, which is omitted in FIG. 12.

The control unit 50 applies a DC voltage from the DC power source 60 to the display-side electrodes 20 by selectively turning on the switches 62 one by one. At the same time, for cells displaying the color of the rear face-side substrate among the cells on the display-side electrodes 20, the switches 70 corresponding to the inner electrodes 24 of the cells are turned on, and the switches 66 corresponding to the outer electrodes 26 of the cells are turned off so as to be in floating states. The DC voltage supplied from the DC power source 60 and the DC voltage supplied from the DC power source 68 are respectively set such that a difference therebetween is a voltage at which the particles start to move.

As a result, the colored particles 16, which are in the cells at positions where the display-side electrodes 20 to which the DC voltage is applied by the DC power source 60 and the inner electrodes 24 to which the DC voltage is applied by the DC power source 68 are perpendicular to one another, are withdrawn to the outer electrode 26, i.e., to the withdrawal region 54. Thus, the color of the inner electrodes 24 can be visually recognized from the top-plane substrate 12.

On the other hand, for cells displaying the color of the colored particles 16 among the cells on the display-side electrodes 20 to which a DC voltage is applied, the switches 70 corresponding to the inner electrodes 24 of the cells are turned off, and the switches 66 corresponding to the outer electrodes 26 of the cells are turned on. The DC voltage supplied from the DC power source 60 and the DC voltage supplied from the DC power source 64 are respectively set such that a difference therebetween is a voltage at which the particles start to move.

As a result, the colored particles 16, which are in the cells at positions where the display-side electrodes 20 to which the DC voltage is applied by the DC power source 60 and the outer electrodes 26 to which the DC voltage is applied by the DC power source 64 are perpendicular to one another, are dispersed to the inner electrodes 24, i.e., to the region 52. Thus the colored particles 16 conceal the back-plane substrate 14. Accordingly, the color of the colored particles 16 can be visually recognized from the top-plane substrate 12.

When initialization is to be made so as to display the color of the back-plane substrate on the entire surface of the image display medium 10, it suffices that all of the switches 62 and the switches 70 are turned on. When initialization is to be made so as to display the color of the colored particles 16 on the entire surface of the image display medium 10, it suffices that all of the switches 62 and the switches 66 are turned on.

In this way, by passive matrix driving, it suffices that a DC voltage is selectively applied to one display-side electrode 20, control is simplified, and electric power consumption can be suppressed.

When passive matrix driving is carried out with respect to a conventional image display medium using plural types of particle groups, it is necessary for a voltage supplied to the display-side electrode and a voltage supplied to the rear face-side electrode to be ½ of the voltage at which the particles move. As a result, it is necessary for the withstand pressures of the switches for switching supply of a voltage to the respective electrodes on and off to be made ½ of the voltage at which the particles move. On the other hand, in the present embodiment, there is one type of the particle group, and thus, there is no need for the withstand pressures of the switches 62, 66, and 70 to be made ½ of the voltage at which the particles move. Therefore, for example, the switches 62 can be made to have high withstand pressures, and the switches 66 and 70 can be made to have low withstand pressures. As a result, the cost of the apparatus can be made inexpensive.

Note that, in FIG. 12, a configuration is shown in which five display-side electrodes 20 and five rear face-side electrodes 28 are provided, and 25(5×5) cells are included. Here, one cell is defined by a region between the substrates where the display-side electrode 20 and the rear face-side electrode 28 are perpendicular to one another when the image display medium is seen in plan view. However, the numbers of the display-side electrodes 20 and the rear face-side electrodes 28 are not limited to these numbers.

(Second Embodiment)

Next, a second embodiment of the present invention will be described. In the present embodiment, an image display medium having a plurality of layers in which particles are enclosed will be described. Portions which are the same as those of the above-described embodiment are denoted by the same reference numerals, and detailed description thereof is omitted.

Figure 13:
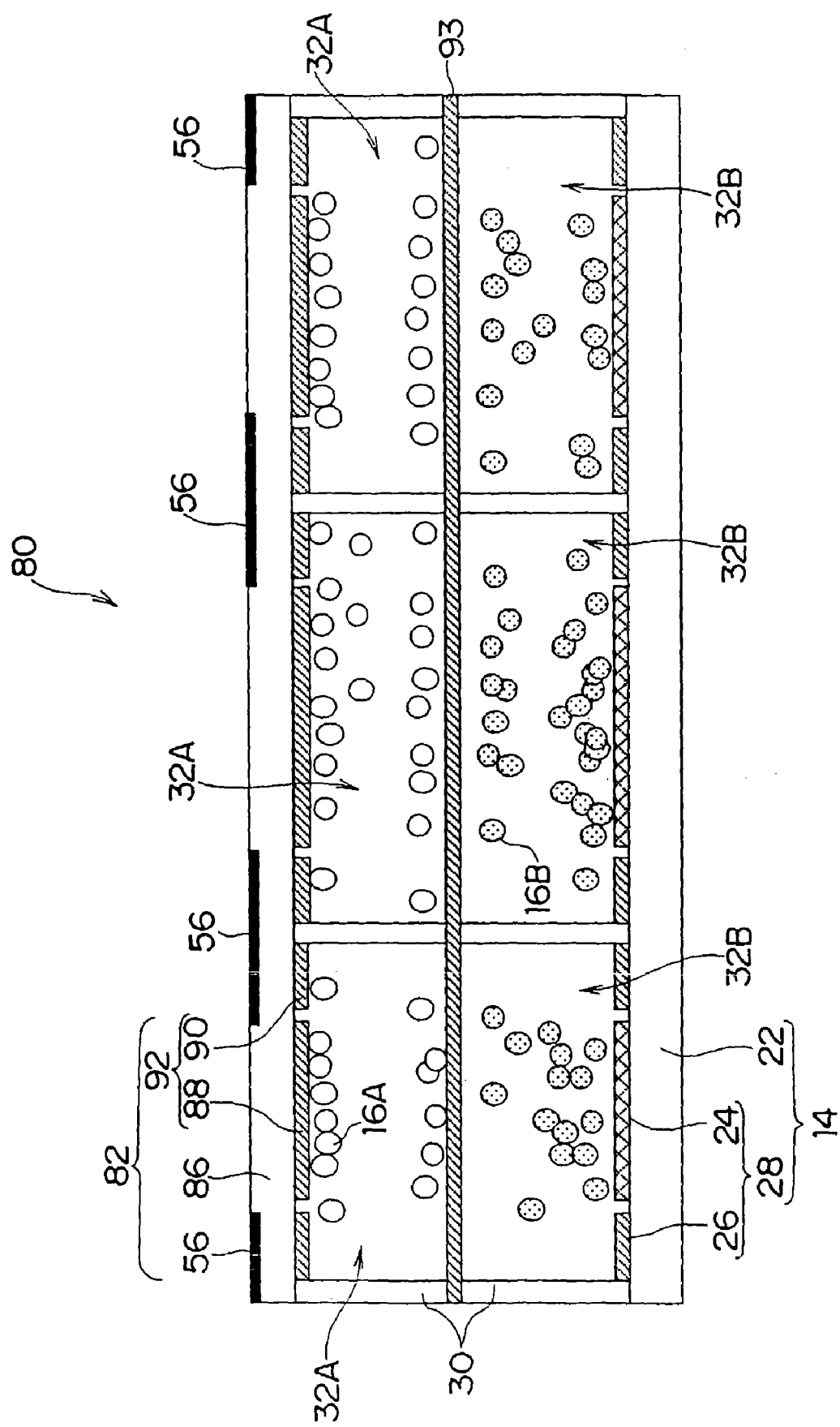
FIG. 13 is a cross-sectional view of an image display medium according to a second embodiment.

An image display medium 80 according to the present embodiment is shown in FIG. 13. The image display medium 80 has a transparent top-plane substrate 82 forming an image display surface and the back-plane substrate 14.

The top-plane substrate 82 includes a display-side electrode 92 formed from a rectangular transparent inner electrode 88 and a rectangular ring-shaped outer electrode 90, formed on a transparent substrate 86. At the substrate 86, a black matrix 56 is formed so as to correspond to the position of the outer electrode 90.

The back-plane substrate 14 has a rear face-side electrode 28 formed from a rectangular inner electrode 24 and a rectangular ring-shaped outer electrode 26, as shown in FIG. 2, formed on the substrate 22.

A transparent electrode layer 93 is provided between the top-plane substrate 82 and the back-plane substrate 14. Grid-shaped spacers 30 as shown in FIG. 2 are provided between the top-plane substrate 82 and the electrode layer 93, and between the electrode layer 93 and the back-plane substrate 14. A predetermined spacing between the top-plane substrate 82 and the electrode layer 93 and a predetermined spacing between the electrode layer 93 and the back-plane substrate 14 are regulated by the spacers 30. Thus, cells 32A and 32B constituting pixels are formed between the substrates by the spacers 30. The electrode layer 93 may not be transparent, and may have a mesh shape.

Conductive colored particles (for example, white particles) 16A having a color that is different from the color of the inner electrode 24 are enclosed in the respective cells 32A. Further, colored particles (for example, red particles) 16B having a color that is different from the colors of the inner electrode 24 and colored particles 16A are enclosed in the respective cells 32B.

Figure 14:
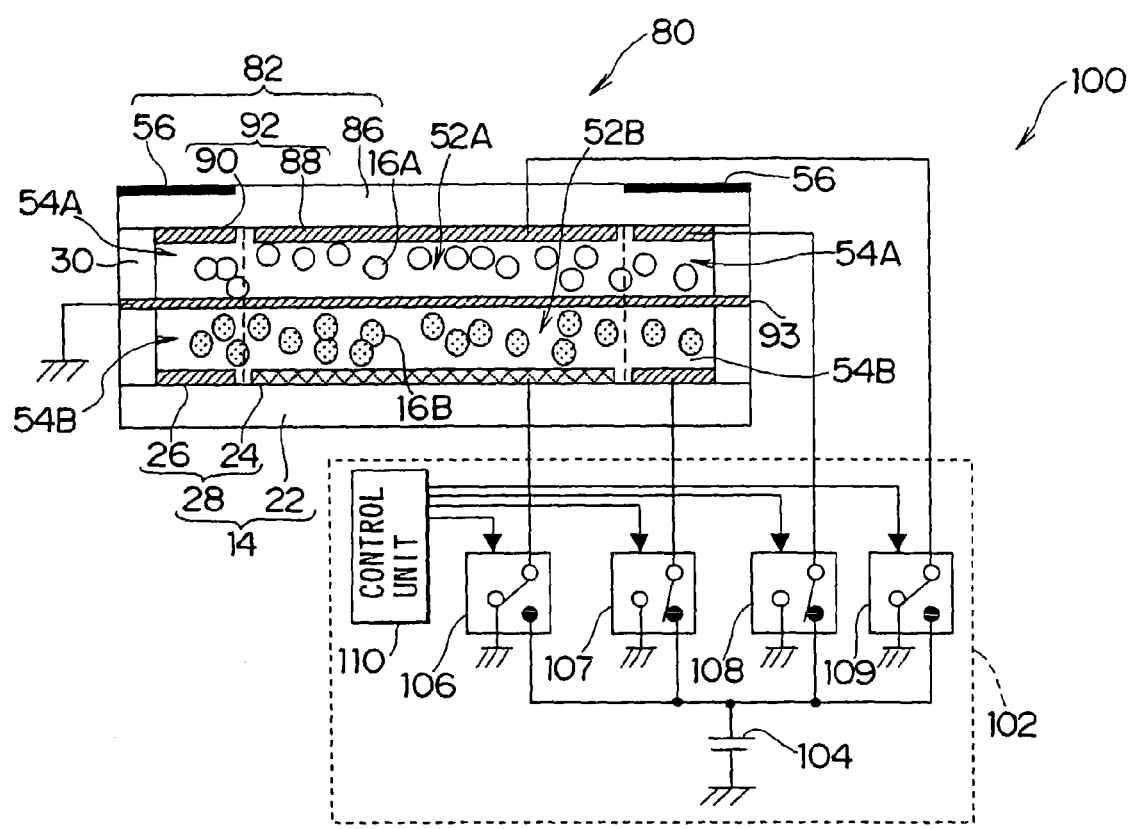
FIG. 14 is a schematic block diagram of an image display apparatus according to the second embodiment.

A schematic configuration of an image display apparatus 100 using the image display medium 80 as shown in FIG. 13 is shown in FIG. 14. The image display apparatus 100 includes the image display medium 80 and a voltage applying section 102. In order to simplify explanation, one cell is shown in FIG. 14.

The voltage applying section 102 is configured so as to include a DC power source 104, switches 106 through 109, and a control unit 110. The switches 106 through 109 are controlled by the control unit 110. The control unit 110 controls the switches 106 through 109 in accordance with image information.

The switch 106 is provided between the inner electrode 24 and the DC power source 104, and switches between the inner electrode 24 being connected to the DC power source 104 and being connected to the grounded side.

The switch 107 is provided between the outer electrode 26 and the DC power source 104, and switches between the outer electrode 26 being connected to the DC power source 104 and being connected to the grounded side.

The switch 108 is provided between the outer electrode 90 and the DC power source 104, and switches between the outer electrode 90 being connected to the DC power source 104 and being connected to the grounded side.

The switch 109 is provided between the inner electrode 88 and the DC power source 104, and switches between the inner electrode 88 being connected to the DC power source 104 and being connected to the grounded side.

Accordingly, when the inner electrode 24 is connected to the DC power source 104 by the switch 106, a DC voltage generated by the DC power source 104 is applied to the inner electrode 24. When the outer electrode 26 is connected to the DC power source 104 by the switch 107, a DC voltage generated by the DC power source 104 is applied to the outer electrode 26. Further, when the outer electrode 90 is connected to the DC power source 104 by the switch 108, a DC voltage generated by the DC power source 104 is applied to the outer electrode 90. When the inner electrode 88 is connected to the DC power source 104 by the switch 109, a DC voltage generated by the DC power source 104 is applied to the inner electrode 88. The electrode layer 93 is grounded.

As shown in FIG. 14, in order to display the color of the colored particles 16A, the control unit 110 controls the switch 109 such that the inner electrode 88 is grounded, and controls the switch 108 such that the outer electrode 90 is connected to the DC power source 104.

A positive DC voltage is then applied to the outer electrode 90. Because the electrode layer 93 is grounded, a positive DC electric field is generated at a withdrawal region 54A, and no electric field is generated at a region 52A.

Because the colored particles 16A are conductive, the colored particles 16A at the outer electrode 90 become positively charged, and move to the electrode layer 93. The colored particles 16A transfer the electric charge to the electrode layer 93 and become negatively charged, and move to the outer electrode 90 again. On the other hand, the colored particles 16A at the electrode layer 93 become negatively charged, and move to the outer electrode 90. The colored particles 16A transfer the electric charge to the outer electrode 90 and become positively charged, and move to the electrode layer 93 again.

By repeating this routine, the colored particles 16A move reciprocally between the substrates in the withdrawal region 54A. At this time, the colored particles 16A move in a direction parallel to a plane including the top-plane substrate by collision of the particles. Finally, as shown in FIG. 14, the colored particles 16A are dispersed to the region 52A where no electric field is generated. As a result, colored particles 16B in the lower layer and the back-plane substrate 14 are concealed by the colored particles 16A, and the color of the colored particles 16A can be visually recognized from the top-plane substrate 82. Note that, in this case, the inner electrode 24 and the outer electrode 26 may be in any state.

Figure 15:
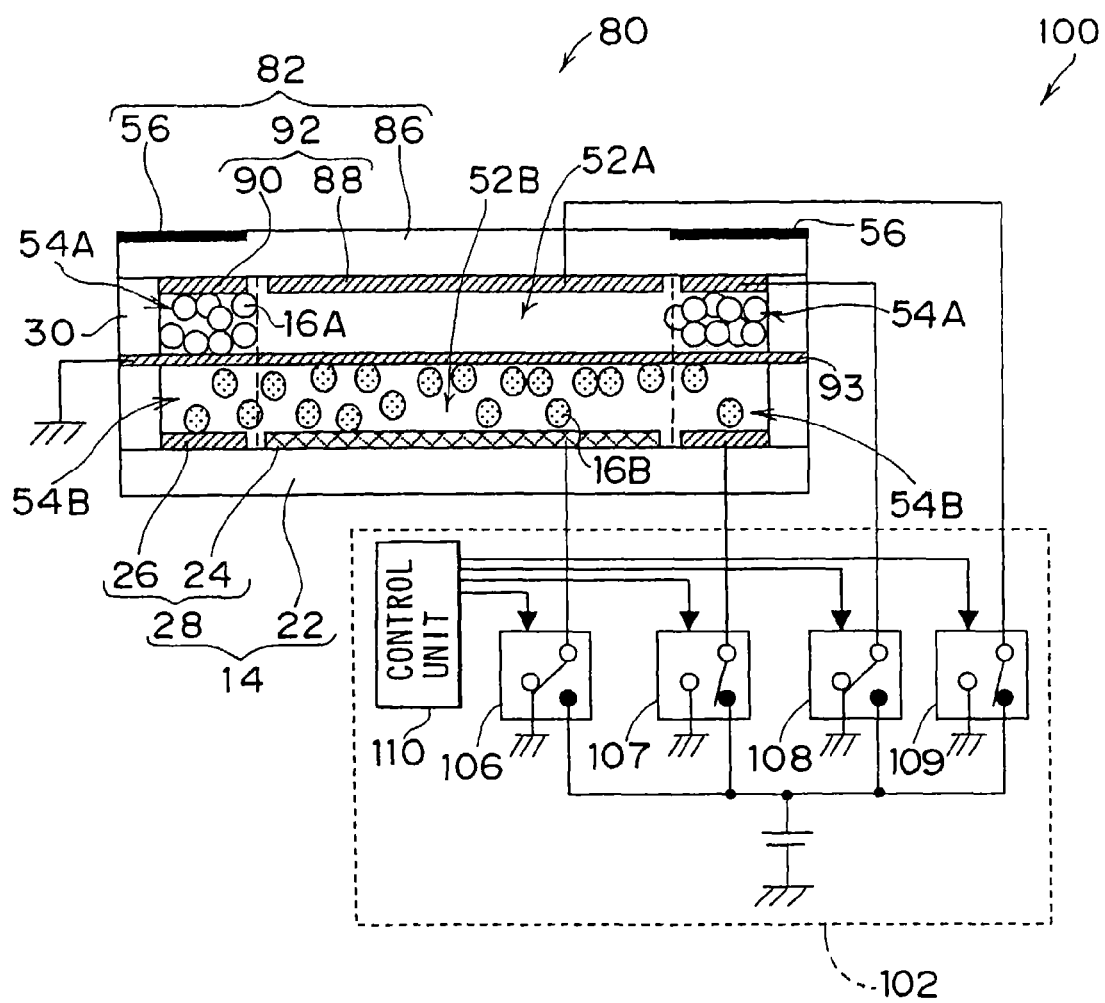
FIG. 15 is a schematic block diagram of the image display apparatus according to the second embodiment.

Next, in order to display the color of the colored particles 16B, as shown in FIG. 15, the control unit 110 controls the switch 109 such that the inner electrode 88 is connected to the DC power source 104, and controls the switch 108 such that the outer electrode 90 is grounded. The control unit 110 also controls the switch 107 such that the outer electrode 26 is connected to the DC power source 104, and controls the switch 106 such that the inner electrode 24 is grounded.

A positive DC voltage is then applied to the inner electrode 88. Because the electrode layer 93 is grounded, a positive DC electric field is generated at the region 52A, and no electric field is generated at the withdrawal region 54A.

Because the colored particles 16A are conductive, the colored particles 16A at the inner electrode 88 become positively charged, and move to the electrode layer 93. The colored particles 16A transfer the electric charge to the electrode layer 93 and become negatively charged, and move to the inner electrode 88 again. On the other hand, the colored particles 16A at the electrode layer 93 become negatively charged, and move to the inner electrode 88. The colored particles 16A transfer the electric charge to the inner electrode 88 and become positively charged, and move to the electrode layer 93 again.

By repeating this routine, the colored particles 16A move reciprocally between the substrates in the region 52A. At this time, the colored particles 16A move in the direction parallel to the plane including the top-plane substrate by collision of the particles. Finally, as shown in FIG. 15, the colored particles 16A are concentrated in the withdrawal region 54A where no electric field is generated.

Further, because a positive DC voltage is applied to the outer electrode 26, a positive DC electric field is generated at a withdrawal region 54B, and no electric field is generated at a region 52B.

Because the colored particles 16B are conductive, the colored particles 16B at the outer electrode 26 become positively charged, and move to the electrode layer 93. The colored particles 16B transfer the electric charge to the electrode layer 93 and become negatively charged, and move to the outer electrode 26 again. On the other hand, the colored particles 16B at the electrode layer 93 become negatively charged, and move to the outer electrode 26. The colored particles 16B transfer the electric charge to the outer electrode 26 and become positively charged, and move to the electrode layer 93 again.

By repeating this routine, the colored particles 16B move reciprocally between the substrates in the withdrawal region 54B. At this time, the colored particles 16B move in the direction parallel to the plane including the top-plane substrate by collision of the particles. Finally, as shown in FIG. 15, the colored particles 16B are dispersed to the region 52B where no electric field is generated.

As a result, the color of the particles 16B can be visually recognized from the top-plane substrate 82.

Figure 16:
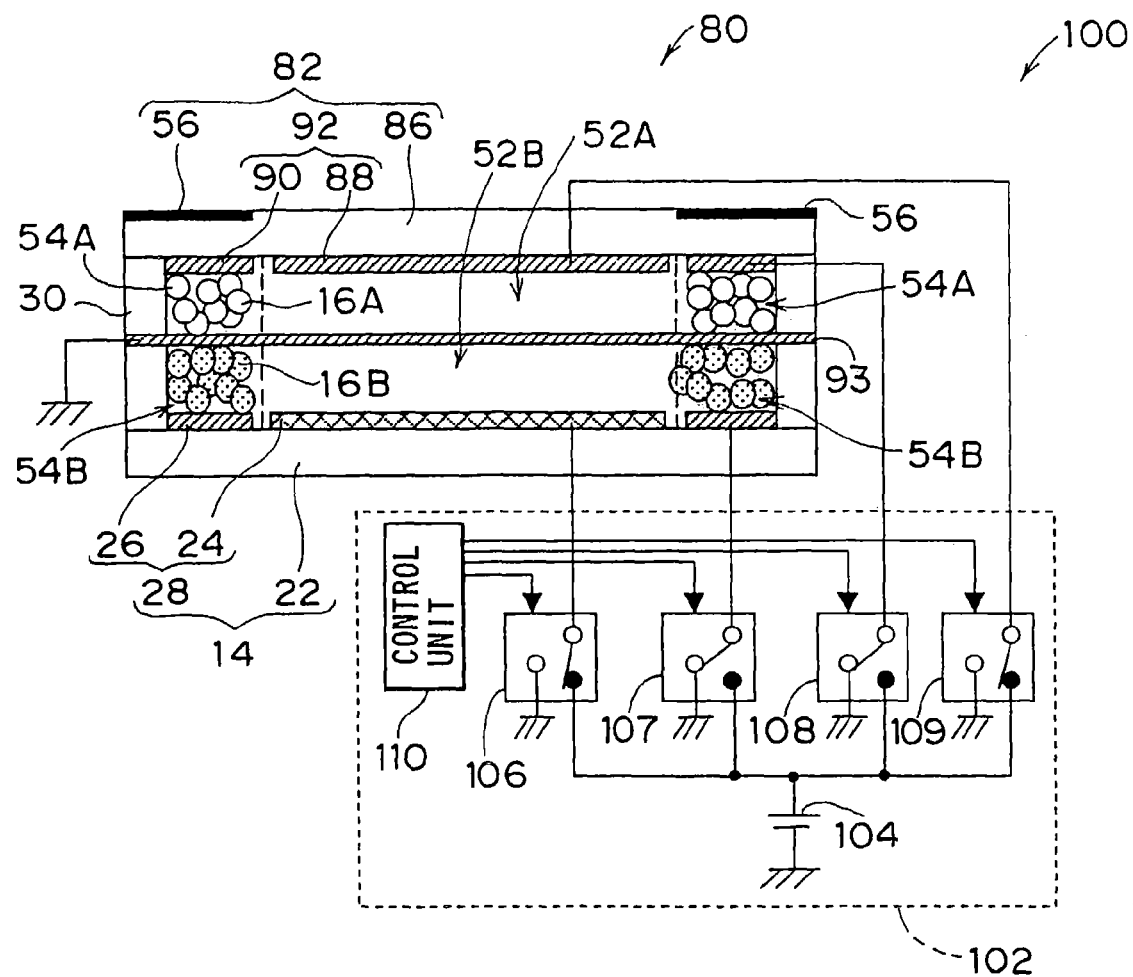
FIG. 16 is a schematic block diagram of the image display apparatus according to the second embodiment.

Next, in order to display the color of the inner electrode 24, as shown in FIG. 16, the control unit 110 controls the switch 109 such that the inner electrode 88 is connected to the DC power source 104, and controls the switch 108 such that the outer electrode 90 is grounded. The control unit 110 also controls the switch 107 such that the outer electrode 26 is grounded, and controls the switch 106 such that the inner electrode 24 is connected to the DC power source 104.

A positive DC voltage is then applied to the inner electrode 88. Because the electrode layer 93 is grounded, a positive DC electric field is generated at the region 52A, and no electric field is generated at the withdrawal region 54A.

Because the colored particles 16A are conductive, the colored particles 16A at the inner electrode 88 become positively charged, and move to the electrode layer 93. The colored particles 16A transfer the electric charge to the electrode layer 93 and become negatively charged, and move to the inner electrode 88 again. On the other hand, the colored particles 16A at the electrode layer 93 become negatively charged, and move to the inner electrode 88. The colored particles 16A transfer the electric charge to the inner electrode 88 and become positively charged, and move to the electrode layer 93 again.

By repeating this routine, the colored particles 16A move reciprocally between the substrates in the region 52A. At this time, the colored particles 16A move in the direction parallel to the plane including the top-plane substrate by collision of the particles. Finally, as shown in FIG. 16, the colored particles 16A are concentrated in the withdrawal region 54A where no electric field is generated.

Further, because a positive DC voltage is applied to the inner electrode 24, a positive DC electric field is generated at the region 52B, and no electric field is generated at the withdrawal region 54B.

Because the colored particles 16B are conductive, the colored particles 16B at the inner electrode 24 become positively charged, and move to the electrode layer 93. The colored particles 16B transfer the electric charge to the electrode layer 93 and become negatively charged, and move to the inner electrode 24 again. On the other hand, the colored particles 16B at the electrode layer 93 become negatively charged, and move to the inner electrode 24. The colored particles 16B transfer the electric charge to the inner electrode 24 and become positively charged, and move to the electrode layer 93 again.

By repeating this routine, the colored particles 16B move reciprocally between the substrates in the region 52B. At this time, the colored particles 16B move in the direction parallel to the plane including the top-plane substrate by collision of the particles. Finally, as shown in FIG. 16, the colored particles 16B are concentrated in the side of the withdrawal region 54B where no electric field is generated.

As a result, the colored particles 16A and 16B are respectively withdrawn to the withdrawal regions 54A and 54B, and the color of the inner electrode 24 can be visually recognized from the top-plane substrate 82.

In this way, by providing the layers of the several types of the particle groups whose colors are respectively different from the color of the back-plane substrate, a variety of colors can be displayed. In the present embodiment, the case is described in which two layers of the particle groups are provided. However, three or more layers of the particle groups may be provided.

(Third Embodiment)

Next, a third embodiment of the present invention will be described. In the present embodiment, an image display apparatus using an image display medium at which a housing portion is provided as a concealing portion on the back-plane substrate will be described. Portions which are the same as those of the above-described embodiment are denoted by the same reference numerals, and detailed description thereof is omitted.

Figure 17:
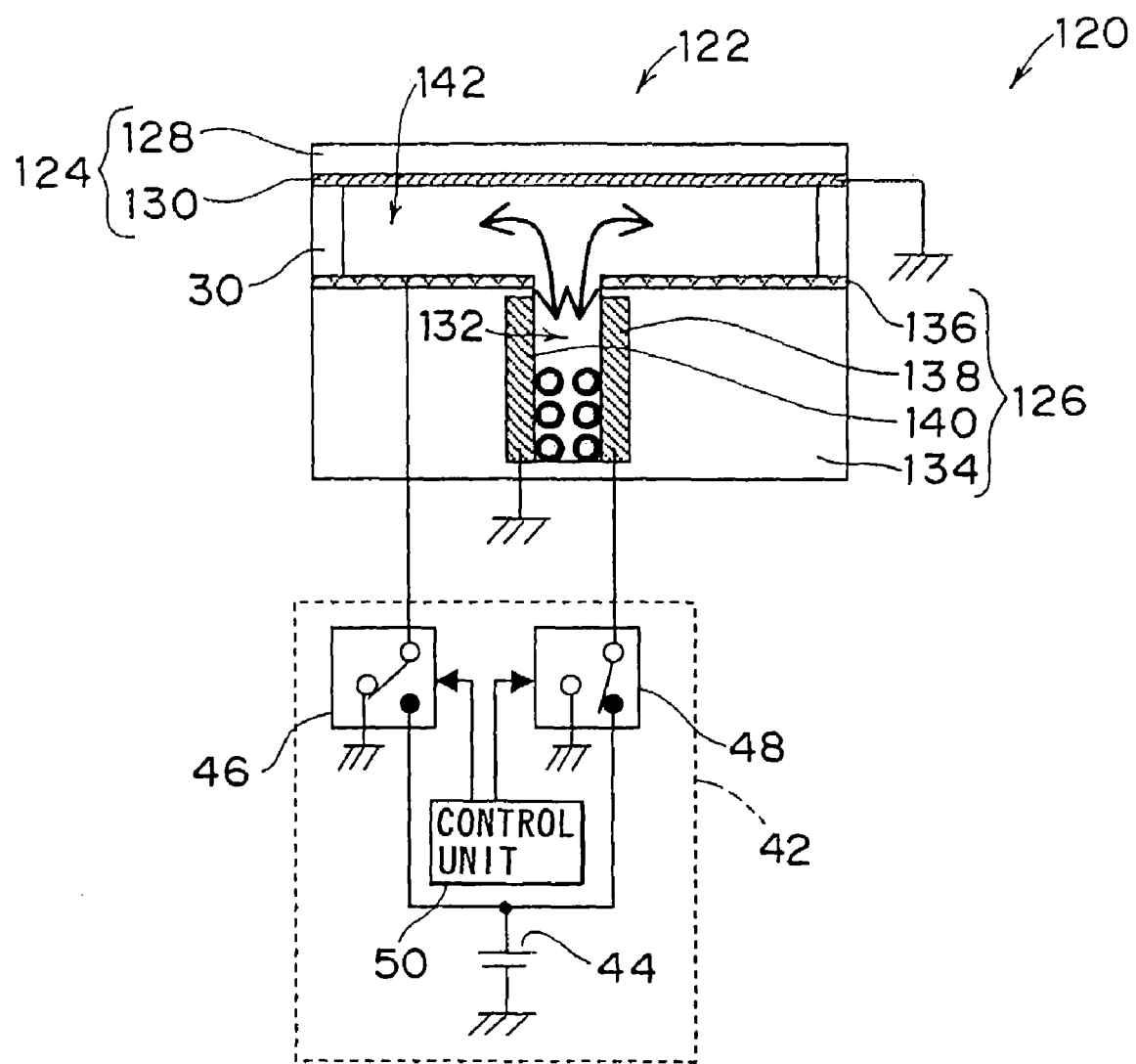
FIG. 17 is a schematic block diagram of an image display apparatus according to a third embodiment.

An image display apparatus 120 according to the present embodiment is shown in FIG. 17. The image display apparatus 120 has an image display medium 122 and a voltage applying section 42. In order to simplify explanation, one cell is shown in FIG. 17.

The image display medium 122 has a transparent top-plane substrate 124 forming an image display surface and a back-plane substrate 126.

Figure 18:
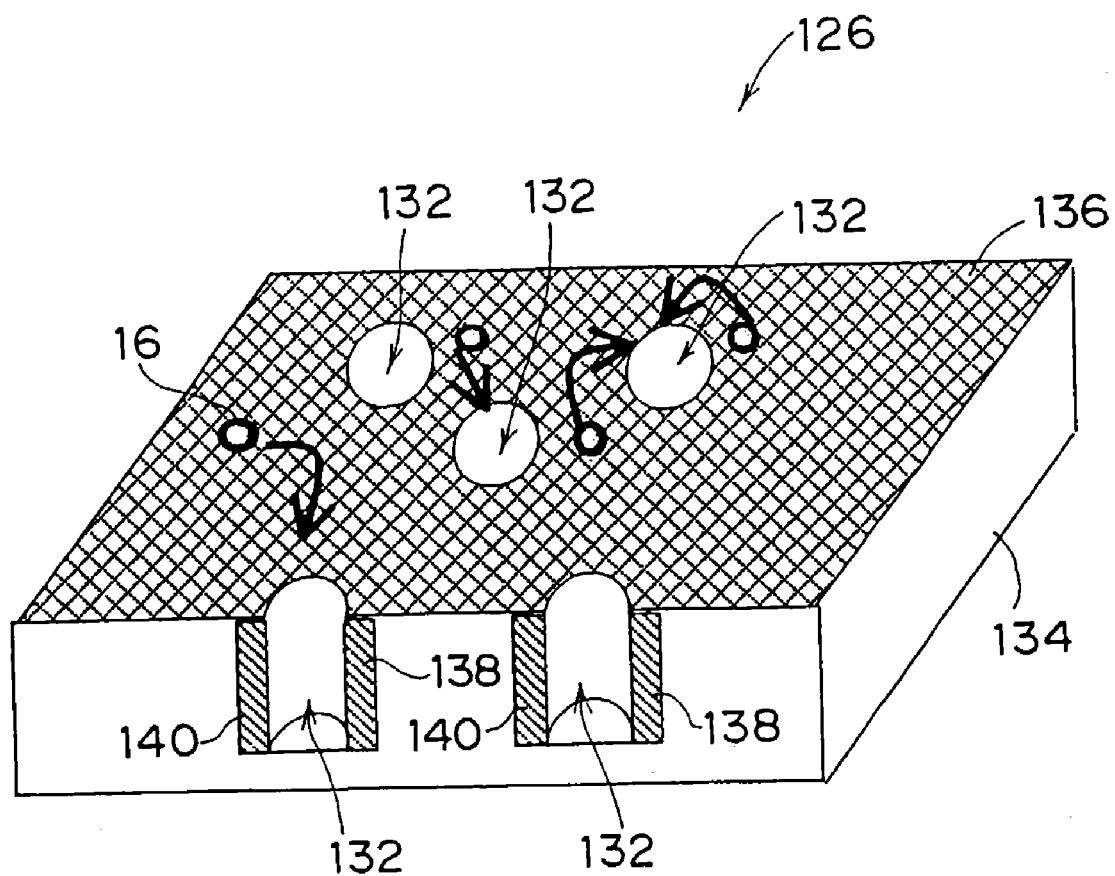
FIG. 18 is a perspective view of a back-plane substrate of an image display medium according to the third embodiment.

The top-plane substrate 124 has a transparent display-side electrode 130, whose entire surface is uniform, formed on a transparent substrate 128. The back-plane substrate 126 includes a rear face-side electrode 136, whose entire surface is uniform, formed on a substrate 134 in which a housing portion 132 is formed. The housing portion 132 has a cylindrical shape as shown in FIG. 18, and a first withdrawal electrode 138 and a second withdrawal electrode 140 are formed so as to face each other at one portion of the inner wall of the housing portion 132. At least one or more housing portions 132 are provided in one cell.

The display-side electrode 130 and the rear face-side electrode 136 correspond to the pair of electrodes of the present invention. The first withdrawal electrode 138 and the second withdrawal electrode 140 correspond to the withdrawal electrodes of the present invention.

A spacer 30 is provided between the top-plane substrate 124 and the back-plane substrate 126. A predetermined spacing between the substrates is regulated by the spacer 30, and a cell 142 constituting pixels is formed between the substrates by the spacer 30.

Conductive colored particles (for example, black particles) 16 having a color that is different from a color of the rear face-side electrode 136 are enclosed in the cell 142.

The voltage applying section 42 is similar to that shown in FIG. 5, and is configured so as to include a DC power source 44, switches 46 and 48, and a control unit 50. The switches 46 and 48 are controlled by the control unit 50. The control unit 50 controls the switches 46 and 48 in accordance with image information.

The switch 46 is provided between the rear face-side electrode 136 of the image display medium 122 and the DC power source 44, and switches between the rear face-side electrode 136 being connected to the DC power source 44 and being connected to the grounded side.

The switch 48 is provided between the first withdrawal electrode 138 and the DC power source 44, and switches between the first withdrawal electrode 138 being connected to the DC power source 44 and being connected to the grounded side. The display-side electrode 130 and the second withdrawal electrode 140 are grounded.

Accordingly, when the rear face-side electrode 136 is connected to the DC power source 44 by the switch 46, a DC voltage generated by the DC power source 44 is applied to the rear face-side electrode 136. When the first withdrawal electrode 138 is connected to the DC power source 44 by the switch 48, a DC voltage generated by the DC power source 44 is applied to the first withdrawal electrode 138.

In order to display the color of the back-plane substrate, i.e., the color of the colored rear face-side electrode 136, the control unit 50 controls the switch 46 such that the rear face-side electrode 136 is connected to the DC power source 44, and controls the switch 48 such that the first withdrawal electrode 138 is grounded.

A positive DC voltage is then applied to the rear face-side electrode 136. Because the display-side electrode 130 is grounded, a positive DC electric field is generated between the substrates, and no electric field is generated in the housing portion 132.

Because the colored particles 16 are conductive, the colored particles 16 at the rear face-side electrode 136 become positively charged, and move to the display-side electrode 130. The colored particles 16 transfer the electric charge to the display-side electrode 130 and become negatively charged, and move to the rear face-side electrode 136 again. On the other hand, the colored particles 16 at the display-side electrode 130 become negatively charged, and move to the side of the rear face-side electrode 136. The colored particles 16 transfer the electric charge to the rear face-side electrode 136 and become positively charged, and move to the display-side electrode 130 again.

By repeating this routine, the colored particles 16 move reciprocally between the substrates. At this time, the colored particles 16 move in a direction parallel to a plane including the top-plane substrate by collision of the particles. The colored particles 16 fall into the housing portion 132 where no electric field is generated. Finally, substantially all of the colored particles 16 are housed in the housing portion 132. As a result, the back-plane substrate 126 is exposed, and the color of the colored rear face-side electrode 136 can be visually recognized from the top-plane substrate.

On the other hand, in order to display the color of the colored particles 16, the control unit 50 controls the switch 46 such that the rear face-side electrode 136 is grounded, and controls the switch 48 such that the first withdrawal electrode 138 is connected to the DC power source 44.

A positive DC voltage is then applied to the first withdrawal electrode 138. Because the second withdrawal electrode is grounded, a positive DC electric field is generated in the housing portion 132, and no electric field is generated between the substrates.

Because the colored particles 16 are conductive, the colored particles 16 at the first withdrawal electrode 138 become positively charged, and move to the second withdrawal electrode 140. The colored particles 16 transfer the electric charge to the second withdrawal electrode 140 and become negatively charged, and move to the first withdrawal electrode 138 again. On the other hand, the colored particles 16 at the second withdrawal electrode 140 become negatively charged, and move to the first withdrawal electrode 138. The colored particles 16 transfer the electric charge to the first withdrawal electrode 138 and become positively charged, and move to the second withdrawal electrode 140 again.

By repeating this routine, the colored particles 16 move reciprocally in the direction parallel to the substrates in the housing portion 132. At this time, the colored particles 16 move in the direction perpendicular to the aforementioned parallel direction by collision of the particles. Therefore, the colored particles 16 rise out of the housing portion 132, and move into a space between the substrates. Finally, substantially all of the colored particles 16 are dispersed between the substrates. As a result, the back-plane substrate 126 is concealed by the colored particles 16, and the color of the colored particles 16 can be visually recognized from the top-plane substrate 124.

In this way, by using the conductive colored particles, a color of the particles can be visually recognized from the top-plane substrate by only applying a DC voltage to the substrates and to the housing portion, and a color of the back-plane substrate can be visually recognized from the top-plane substrate by concealing the particles. Accordingly, there is no need to provide an AC power source generating an alternating voltage in the voltage applying section 42. Therefore, power-saving can be achieved, and the apparatus can be configured so as to be inexpensive.

Further, because of the configuration in which a housing portion is provided on the back-plane substrate, and the particles are housed therein, there is no need to provide a black matrix as shown in FIG. 11 on the top-plane substrate.

Figure 19:
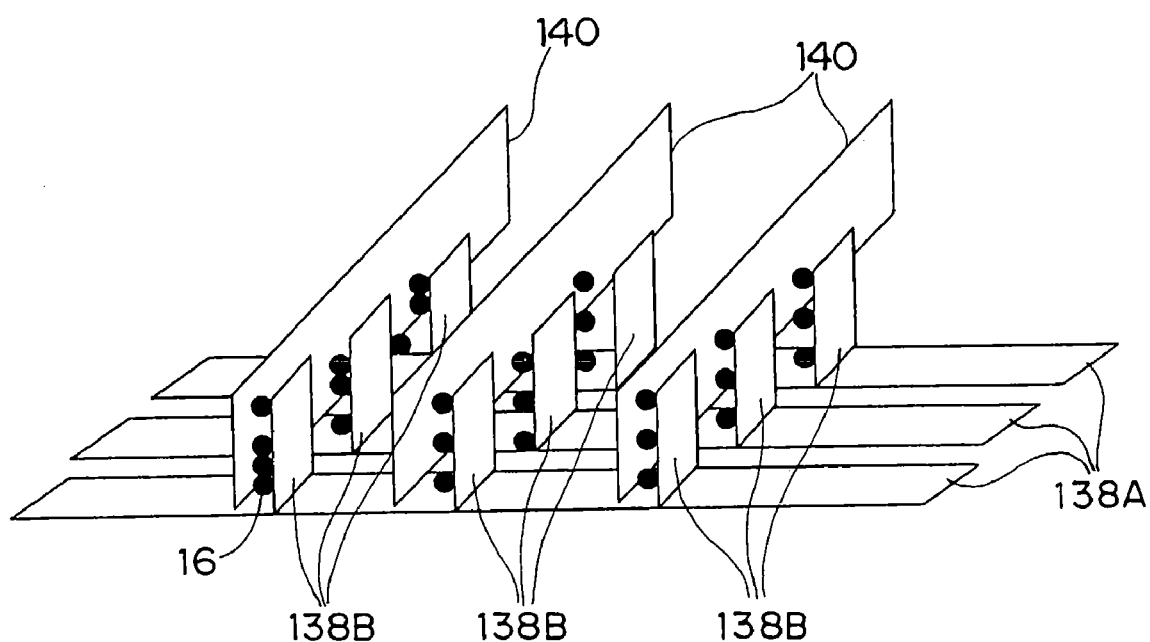
FIG. 19 is a perspective view showing a schematic structure of withdrawal electrodes according to the third embodiment.

The first withdrawal electrode 138 and the second withdrawal electrode 140 may be made to be passive matrix structures as shown in FIG. 19. As shown in FIG. 19, the first withdrawal electrode 138 has a structure in which electrodes 138B are vertically provided on line-shaped electrodes 138A. The second withdrawal electrodes 140 are line-shaped, and are disposed so as to face the electrodes 138B. In this case, a DC voltage is applied to the electrodes 138A, at which the electrodes 138B are provided, in the housing portion 132 in which the particles are required to move. The second withdrawal electrode 140 of the housing portion 132 is grounded. As a result, the colored particles 16 in the housing portion 132 can be selectively moved.

(Fourth Embodiment)

Next, a fourth embodiment of the present invention will be described. In the present embodiment, an image display medium having a plurality of layers in which particles are enclosed will be described. Portions which are the same as those of the above-described embodiment are denoted by the same reference numerals, and detailed description thereof is omitted.

Figure 20:
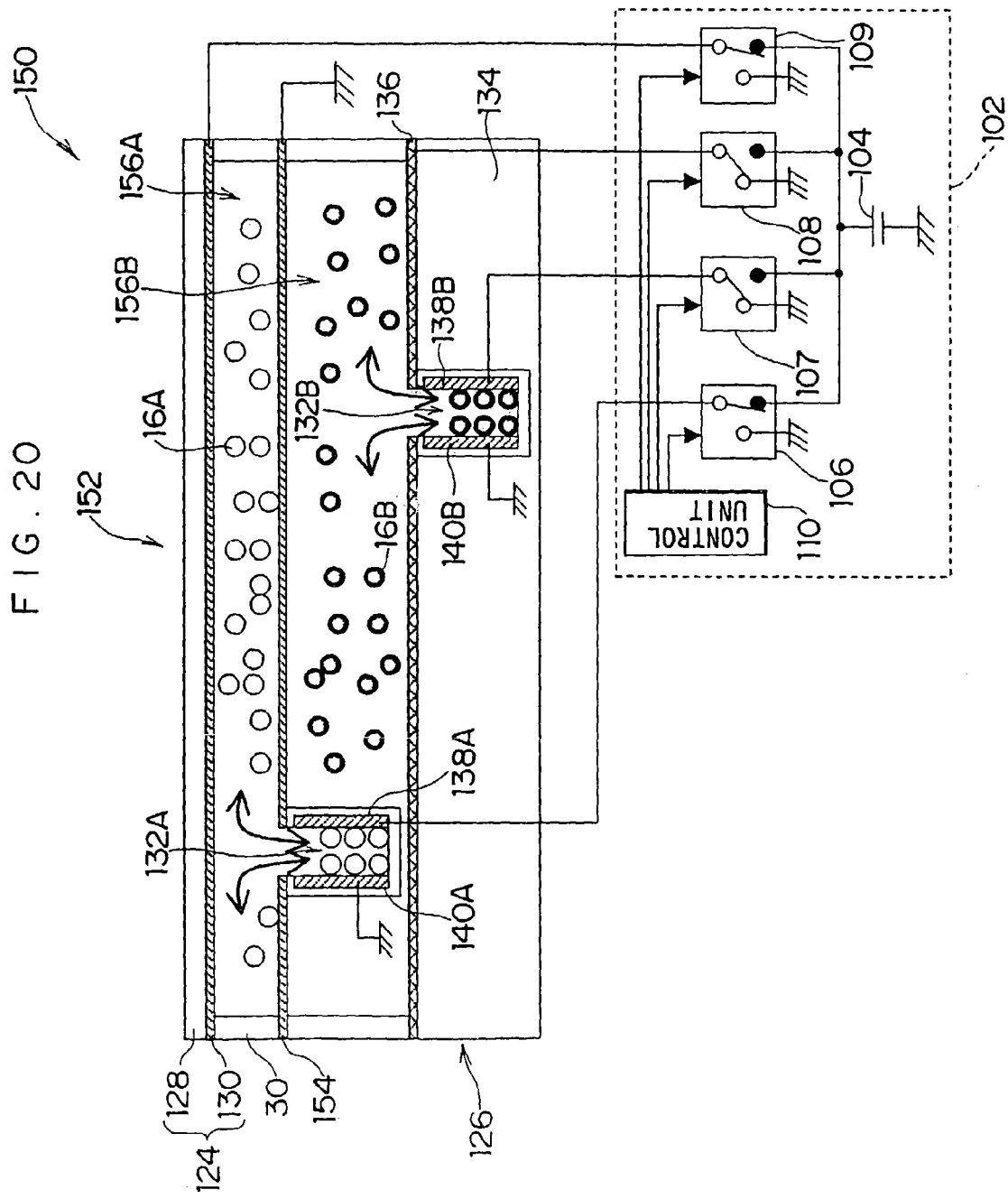
FIG. 20 is a schematic block diagram of an image display apparatus according to a fourth embodiment.
Figure 21:
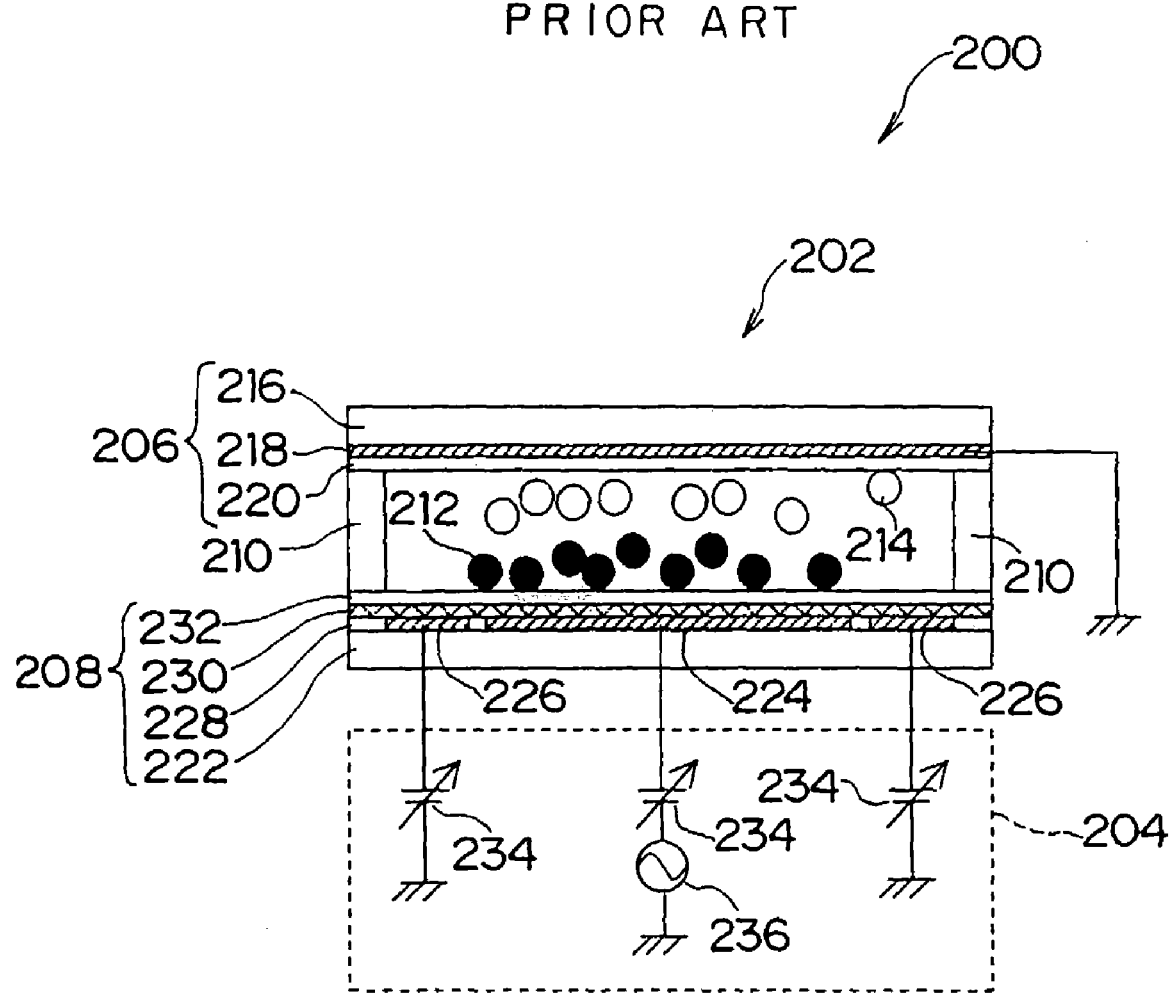
FIG. 21 is a schematic block diagram of an image display apparatus in the prior art.
Figure 22:
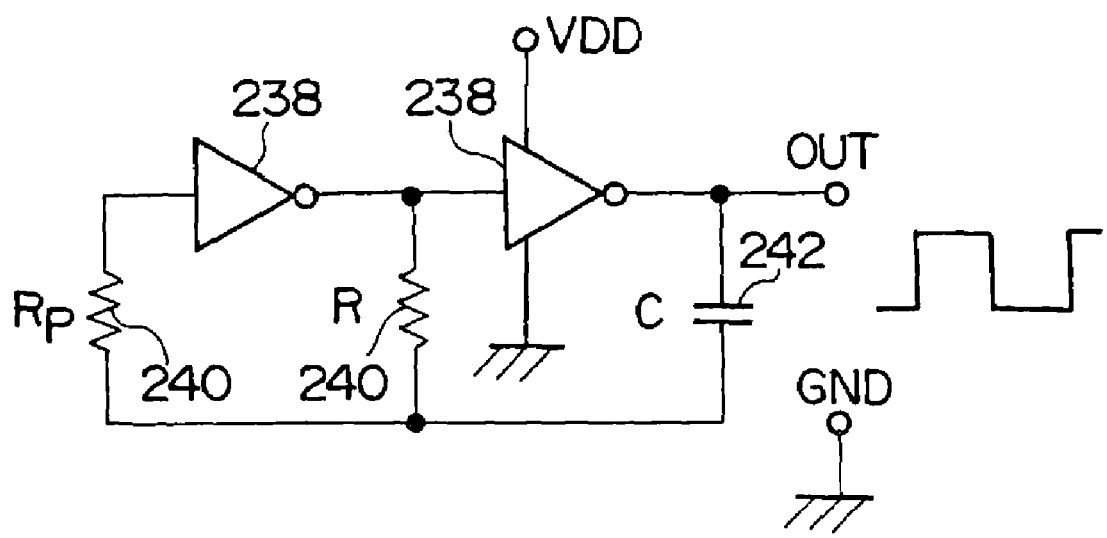
FIG. 22 is a circuit diagram of a voltage applying section in the prior art.

An image display apparatus 150 according to the present embodiment is shown in FIG. 20. The image display apparatus 150 has an image display medium 152 and the voltage applying section 102.

The image display medium 152 has a transparent top-plane substrate 124 forming an image display surface and the back-plane substrate 126. In order to simplify explanation, one cell is shown in FIG. 20.

The top-plane substrate 124 and the back-plane substrate 126 are similar to that shown in FIG. 17. A transparent electrode layer 154 is provided between the top-plane substrate 124 and the back-plane substrate 126. Spacers 30 are provided between the top-plane substrate 124 and the electrode layer 154, and between the electrode layer 154 and the back-plane substrate 126. A predetermined spacing between the top-plane substrate 124 and the electrode layer 154 and a predetermined spacing between the electrode layer 154 and the back-plane substrate 126 are regulated by the spacer 30, and cells 156A and 156B constituting pixels are formed between the substrates by the spacer 30. Conductive colored particles (for example, white particles) 16A having a color that is different from a color of the rear face-side electrode 136 are enclosed in the cell 156A. Further, conductive colored particles (for example, black particles) 16B having a color, which is different from the color of the rear face-side electrode 136 and the color of the colored particles 16A, are enclosed in the cell 156B.

Housing portions 132A and 132B which are similar to that shown in FIG. 17 are respectively provided at the electrode layer 154 and the back-plane substrate 126.

The voltage applying section 102 has the same structure with that shown in FIG. 14. The switch 106 is provided between the first withdrawal electrode 138A and the DC power source 104, and switches between the first withdrawal electrode 138A being connected to the DC power source 104 and being connected to the grounded side.

The switch 107 is provided between the first withdrawal electrode 138B and the DC power source 104, and switches between the first withdrawal electrode 138B being connected to the DC power source 104 and being connected to the grounded side.

The switch 108 is provided between the rear face-side electrode 136 and the DC power source 104, and switches between the rear face-side electrode 136 being connected to the DC power source 104 and being connected to the grounded side.

The switch 109 is provided between the display-side electrode 130 and the DC power source 104, and switches between the display-side electrode 130 being connected to the DC power source 104 and being connected to the grounded side.

Accordingly, when the first withdrawal electrode 138A is connected to the DC power source 104 by the switch 106, a DC voltage generated by the DC power source 104 is applied to the first withdrawal electrode 138A. When the first withdrawal electrode 138B is connected to the DC power source 104 by the switch 107, a DC voltage generated by the DC power source 104 is applied to the first withdrawal electrode 138B. When the rear face-side electrode 136 is connected to the DC power source 104 by the switch 108, a DC voltage generated by the DC power source 104 is applied to the rear face-side electrode 136. When the display-side electrode 130 is connected to the DC power source 104 by the switch 109, a DC voltage generated by the DC power source 104 is applied to the display-side electrode 130. The electrode layer 154 is grounded.

In order to display the color of the colored particles 16A, the control unit 110 controls the switch 106 such that the first withdrawal electrode 138A is connected to the DC power source 104, and controls the switch 109 such that the display-side electrode 130 is grounded.

A positive DC voltage is then applied to the first withdrawal electrode 138A. Because the electrode layer 154 and a second withdrawal electrode 140A are grounded, a positive DC electric field is generated in the housing portion 132A, and no electric field is generated in the electrode layer 154. The colored particles 16A in the housing portion 132A rise, and are dispersed between the display-side electrode 130 and the electrode layer 154. Accordingly, the color of the colored particles 16A can be visually recognized from the top-plane substrate.

In order to display the color of the colored particles 16B, the control unit 110 controls the switch 106 such that the first withdrawal electrode 138A is grounded, and controls the switch 107 such that the first withdrawal electrode 138B is connected to the DC power source 104. The control unit 110 also controls the switch 108 such that the rear face-side electrode 136 is grounded, and controls the switch 109 such that the display-side electrode 130 is connected to the DC power source 104.

A positive DC voltage is applied to the display-side electrode 130 and the electrode layer 154, and a positive DC electric field is generated in the housing portion 132B. The colored particles 16A are concentrated in the housing portion 132A, and the colored particles 16B are dispersed between the electrode layer 154 and the rear face-side electrode 136. AS a result, the color of the colored particles 16B can be visually recognized from the side of the top-plane substrate 124.

In order to display the color of the rear face-side electrode 136, the control unit 110 controls the switch 106 such that the first withdrawal electrode 138A is grounded, and controls the switch 107 such that the first withdrawal electrode 138B is grounded. The control unit 110 also controls the switch 108 such that the rear face-side electrode 136 is connected to the DC power source 104, and controls the switch 109 such that the display-side electrode 130 is connected to the DC power source 104.

A positive DC voltage is applied to the display-side electrode 130 and the electrode layer 154, and to the electrode layer 154 and the rear face-side electrode 136. The colored particles 16A are concentrated in the housing portion 132A, and the colored particles 16B are concentrated in the housing portion 132B. As a result, the color of the rear face-side electrode 136 can be visually recognized from the top-plane substrate 124.

In this way, by providing the layers of plural types of the particle groups whose colors are respectively different from the color of the back-plane substrate, a variety of colors can be displayed. In the present embodiment, the case is described in which two layers of the particle groups are provided. However, three or more of layers of the particle groups may be provided.

What is claimed is:

1. An image display apparatus comprising:
    an image display medium which has a light-transmissive top-plane substrate, a back-plane substrate disposed so as to face the top-plane substrate, a pair of electrodes respectively provided on a surface of the top-plane substrate facing the back-plane substrate and on a surface of the back-plane substrate facing the top-plane substrate, a conductive particle group which is enclosed between the top-plane substrate and the back-plane substrate so as to move between the pair of electrodes due to an electric field formed by a voltage which is applied to the pair of electrodes and which has a color that is different from a color of the back-plane substrate, and a withdrawal electrode portion provided at a withdrawal region of the particle group; and
    a voltage applying section which applies a DC voltage for moving the particle group to the withdrawal region to at least one of the pair of electrodes when the color of the back-plane substrate is to be displayed, and which applies a DC voltage for moving the particle group to the outside of the withdrawal region, to the withdrawal electrode portion when the color of the particle group is to be displayed.

2. An image display apparatus according to claim 1, further comprising a concealing portion for concealing the particle group.

3. An image display apparatus according to claim 2, wherein the concealing portion is a housing portion which is provided at the back-plane substrate and which is for housing the particle group, and the withdrawal electrode portion is a pair of withdrawal electrodes provided at the housing portion.

4. An image display apparatus according to claim 3, wherein the housing portion is provided in the back-plane substrate, and is a hole shape, and the withdrawal electrode portion is a pair of withdrawal electrodes provided at positions facing one another at side faces of the housing portion.

5. An image display apparatus according to claim 1, wherein the pair of electrodes and the withdrawal electrode portion are a passive matrix structure.

6. An image display apparatus according to claim 2, wherein the pair of electrodes and the withdrawal electrode portion are a passive matrix structure.

7. An image display apparatus according to claim 3, wherein the pair of electrodes and the withdrawal electrode portion are a passive matrix structure.

8. An image display apparatus according to claim 1 further comprising, between the top-plane substrate and the back-plane substrate, a layer having a conductive particle group having a color that is different from the color of the particle group.

9. An image display apparatus according to claim 7 further comprising, between the top-plane substrate and the back-plane substrate, a layer having a conductive particle group having a color that is different from the color of the particle group.

10. An image display apparatus comprising:
    an image display medium which has a light-transmissive top-plane substrate, a back-plane substrate disposed so as to face the top-plane substrate, a pair of electrodes formed from a first electrode provided on a surface of the top-plane substrate facing the back-plane substrate and a second electrode provided on a surface of the back-plane substrate facing the top-plane substrate, a conductive particle group which is enclosed between the top-plane substrate and the back-plane substrate so as to move between the pair of electrodes due to an electric field formed by a voltage applied to the pair of electrodes, and which has a color that is different from a color of the back-plane substrate, and a withdrawal electrode disposed at a region on the back-plane substrate other than a region where the second electrode is provided; and
    a voltage applying section,
    wherein the voltage applying section makes the particle group move to a withdrawal region which is between the first electrode and the withdrawal electrode by applying a first DC voltage to at least one of the pair of electrodes, whereby the color of the back-plane substrate is displayed, and
    the voltage applying section makes the particle group move to the outside of the withdrawal region by applying a second DC voltage to the withdrawal electrode, and whereby the color of the particle group is displayed.

11. An image display apparatus according to claim 10, further comprising a concealing portion for concealing the particle group.

12. An image display apparatus according to claim 11, wherein the pair of electrodes and the withdrawal electrode are a passive matrix structure.

13. An image display apparatus according to claim 12 further comprising, between the top-plane substrate and the back-plane substrate, a layer having a conductive particle group having a color that is different from the color of the particle group.

14. An image display apparatus according to claim 10, wherein the pair of electrodes and the withdrawal electrode are a passive matrix structure.

15. An image display apparatus according to claim 10, further comprising, between the top-plane substrate and the back-plane substrate, a layer having a conductive particle group having a color that is different from the color of the particle group.

* * * * *